US011016966B2

(12) United States Patent
Kim et al.

(10) Patent No.: US 11,016,966 B2
(45) Date of Patent: May 25, 2021

(54) SEMANTIC ANALYSIS-BASED QUERY RESULT RETRIEVAL FOR NATURAL LANGUAGE PROCEDURAL QUERIES

(71) Applicant: Adobe Inc., San Jose, CA (US)

(72) Inventors: Doo Soon Kim, San Jose, CA (US); Walter Chang, San Jose, CA (US)

(73) Assignee: ADOBE INC., San Jose, CA (US)

( * ) Notice: Subject to any disclaimer, the term of this patent is extended or adjusted under 35 U.S.C. 154(b) by 92 days.

(21) Appl. No.: 16/019,152

(22) Filed: Jun. 26, 2018

(65) Prior Publication Data

US 2019/0392066 A1 Dec. 26, 2019

(51) Int. Cl.
*G06F 16/24* (2019.01)
*G06F 16/2457* (2019.01)
*G06F 40/30* (2020.01)
*G06F 16/242* (2019.01)

(52) U.S. Cl.
CPC .......... *G06F 16/243* (2019.01); *G06F 16/24* (2019.01); *G06F 16/2457* (2019.01); *G06F 16/24578* (2019.01); *G06F 40/30* (2020.01)

(58) Field of Classification Search
CPC ....... G06F 16/24; G06F 16/2457; G06F 40/30
See application file for complete search history.

(56) References Cited

U.S. PATENT DOCUMENTS

| 7,801,885 | B1* | 9/2010 | Verma | G06F 16/9535 |
| | | | | 707/713 |
| 2009/0125598 | A1* | 5/2009 | Sun | H04L 51/043 |
| | | | | 709/206 |
| 2009/0177645 | A1* | 7/2009 | Heck | G06F 16/24575 |
| 2013/0224718 | A1* | 8/2013 | Woodward | G09B 7/00 |
| | | | | 434/350 |

(Continued)

OTHER PUBLICATIONS

Bannard, Colin, et al., "Paraphrasing with Bilingual Parallel Corpora", Proceedings of the 43rd Annual Meeting of the Association for Computational Linguistics, Jun. 2005, 8 pages.

(Continued)

*Primary Examiner* — Bryan S Blankenagel
(74) *Attorney, Agent, or Firm* — Kilpatrick Townsend & Stockton LLP

(57) ABSTRACT

Various embodiments describe techniques for retrieving query results for natural language procedural queries. A query answering (QA) system generates a structured semantic representation of a natural language query. The structured semantic representation includes terms in the natural language query and the relationship between the terms. The QA system retrieves a set of candidate query results for the natural language query from a repository, generates a structured semantic representation for each candidate query result, and determines a match score between the natural language query and each respective candidate query result based on the similarity between the structured semantic representations for the natural language query and each (Continued)

respective candidate query result. A candidate query result having the highest match score is selected as the query result for the natural language query. In some embodiments, paraphrasing rules are generated from user interaction data and are used to determine the match score.

20 Claims, 12 Drawing Sheets

(56) References Cited

U.S. PATENT DOCUMENTS

| | | | | |
|---|---|---|---|---|
| 2014/0279250 | A1* | 9/2014 | Williams | G06Q 30/0625 705/26.62 |
| 2017/0228372 | A1* | 8/2017 | Moreno | G06F 16/24522 |
| 2018/0089569 | A1* | 3/2018 | Croutwater | G06F 40/205 |
| 2018/0150459 | A1* | 5/2018 | Farid | G06F 16/24578 |
| 2018/0210966 | A1* | 7/2018 | Bedi | G06F 16/9024 |
| 2019/0279104 | A1* | 9/2019 | Brake | G06F 40/30 |
| 2019/0279141 | A1* | 9/2019 | Kannan | G06Q 30/0202 |
| 2019/0294648 | A1* | 9/2019 | Yu | G06F 16/953 |

OTHER PUBLICATIONS

Berant, Jonathan, et al., "Semantic Parsing Via Paraphrasing", Proceedings of the 52nd Annual Meeting of the Association for Computational Linguistics, Jun. 2014, 11 pages.

Bilotti, Matthew W., et al., "Rank Learning for Factoid Question Answering with Linguistic and Semantic Constraints", Proceedings of the 19th ACM International Conference on Information and Knowledge Management, Oct. 2010, 10 pages.

Bogdanova, Dasha, et al., "This is How We Do It: Answer Reranking for Open-Domain How Questions with Paragraph Vectors and Minimal Feature Engineering", Proceedings of NAACL-HLT, Jun. 2016, 6 pages.

Bordes, Antoine, et al., "Question Answering with Subgraph Embeddings", Proceedings of the 2014 Conference on Empirical Methods in Natural Language Processing (EMNLP), Oct. 2014, 6 pages.

Brown, Peter F., et al., "The Mathematics of Statistical Machine Translation: Parameter Estimation", Computational Linguitstice—Special Issue on Using Large Corpora: II, vol. 19, Issue 2, Jun. 1993, 50 pages.

Dong, Li, et al., "Learning to Paraphrase for Question Answering", arXiv:1708.06022v1, [cs.CL], EMNLP, Aug. 20, 2017, 12 pages.

Figueroa, Alejandro, et al., "Learning to Rank Effective Paraphrases from Query Logs for Community Question Answering", Proceedings of the Twenty-Seventh AAAI Conference on Artificial Intelligence, Jul. 2013, 7 pages.

Fried, Daniel, et al., "Higher-Order Lexical Semantic Models for Non-Factoid Answer Reranking", Transactions of the Association for Computational Linguistics, vol. 3, Apr. 2015, 14 pages.

Gao, Jianfeng, et al., "Dependence Language Model for Information Retrieval", SIGIR Proceedings of the $27^{th}$ Annual International ACM SIGIR Conference on Research and Development in Information Retrieval, Jul. 2004, 9 pages.

Guzman Francisco, et al., "Machine Translation Evaluation Meets Community Question Answering", Proceedings of the 54th Annual Meeting of the Association for Computational Linguistics, Aug. 2016, 7 pages.

Huston, Samuel, et al., "A Comparison of Retrieval Models Using Term Dependencies", Proceedings of the $23^{rd}$ ACM International Conference on Information and Knowledge Management, Nov. 2014, 10 pages.

Iyyer, Mohit, et al., "A Neural Network for Factoid Question Answering Over Paragraphs", Proceedings of the 2014 Conference on Empirical Methods in Natural Language Processing (EMNLP), Oct. 2014, 12 pages.

Jansen, Peter, et al., "Discourse Complements Lexical Semantics for Non-Factoid Answer Reranking, Proceedings of the 52nd Annual Meeting of the Association for Computational Linguistics", Jun. 2014, 10 pages.

Jones, K. Sparck, et al., "A Probabilistic Model of Information Retrieval: Development and Comparitive Experiments", Information Processing and Management: an International Journal, vol. 36, Issue 6, Nov. 2000, 35 pages.

Zhou, Guangyou, et al., "Phrase-Based Translation Model for Question Retireval in Community Question Answer Archives", Proceedings of the 49th Annual Meeting of the Association for Computational Linguistics, Jun. 2011, 10 pages.

Li, Xiao, "Understanding the Semantic Structure of Noun Phrase Queries", Proceedings of the 48th Annual Meeting of the Association for Computational Linguistics, Jul. 2010, 9 pages.

Moschitti, Alessandro, et al., "Kernels on Linguistics Structures for Answer Extraction", Proceedings of ACL-08: HLT, Short Papers (Companion Volume), Association for Computational Linguistics, Jun. 2008, 4 pages.

Oh, Jong-Hoon, et al., "Why Question Answering Using Sentiment Analysis and Word Classes", Proceedings of the 2012 Joint Conference on Empirical Methods in Natural Language Processing and Computational Natural Language Learning, Association Computational Linguistics, Jul. 2012, 11 pages.

Oh, Jong-Hoon, et al., "Why-Question Answering Using Intra-and Inter-Sentential Causal Relations", Proceedings of the 51st Annual Meeting of the Association for Computational Linguistics, Aug. 2013, 11 pages.

Pantel, Patrick, et al., "Mining Entity Types from Query Logs Via User Intent Modeling", Proceedings of the 50th Annual Meeting of the Association for Computational Linguistics, Jul. 2012, 9 pages.

Park, Jae Hyun, et al., "Using Key Concepts in a Translation Model for Retrieval", Proceedings of the $38^{th}$ International ACM SIGIR Conference on Research and Development in Information Retrieval, Aug. 2015, 4 pages.

Park, Jae-Hyun, et al., "A Quasi-Synchronous Dependence Model for Information Retrieval", Proceedings of the $20^{th}$ ACM International Conference on Information and Knowledge Management, Oct. 2011, 10 pages.

Pinter, Yuval, et al., "Syntactic Parsing of Web Queries with Question Intent", Proceedings of NAACL-HLT, Association for Computational Linguistics, Jun. 2016, 11 pages.

Savenkov, Denis, "Ranking Answers and Web Passages for Non-Factoid Question Answering: Emory University at TREC LiveQA", Semantics Scholar, https://trec.nist.gov/pubs/trec24/papers/emory-QA.pdf, 2015, 8 pages.

Severyn, Aliaksei, et al., "Structural Relationships for Large-Scale Learning of Answer Re-ranking", Proceedings of the $35^{th}$ International ACM SIGIR Conference on Research and Development in Information Retrieval, Aug. 2012, 10 pages.

Sharp, Rebecca, et al., "Spinning Straw into Gold: Using Free Text to Train Monolingual Alignment Models for Non-Factoid Question Answering", Human Language Technologies: The 2015 Annual Conference of the North American Chapter of the ACL, May/Jun. 2015, 7 pages.

Shen, Dan, et al., "Using Semantic Roles to Improve Question Answering", Proceedings of the 2007 Joint Conference on Empirical Methods in Natural Language Processing and Computational Natural Language Learning, Association for Computational Linguistics, Jun. 2007, 10 pages.

Stoyanov, Veselin, et al., "Multi-Perspective Question Answering Using the OpQA Corpus", Proceedings of Human Language Technology Conference and Conference on Empirical Methods in Natural Language Processing (HLT/EMNLP), Association for Computational Linguistics, Oct. 2005, 8 pages.

Svore, Krysta M., et al., "How Good is a Span of Terms? Exploiting Proximity to Improve Web Retrieval", Proceedings of the $33^{rd}$ International ACM SIGIR Conference on Research and Development in Information Retrieval, Jul. 2010, 8 pages.

Turney, Peter D., et al., "From Frequency to Meaning: Vector Space Models of Semantics", Journal of Artificial Intelligence Research, vol. 37, Issue 1, Jan. 2010, 48 pages.

Zhao, Shiqi, et al., "Paraphrasing With Search Engine Query Logs", Proceedings of the 23rd International Conference on Computational Linguistics (Coling 2010), Aug. 2010, 9 pages.

(56) References Cited

OTHER PUBLICATIONS

Zhao, Shiqi, et al., "Learning Question Paraphrases for QA From Encarta Logs", International Joint Conferences on Artificial Intelligence, 2007, 6 pages.

* cited by examiner

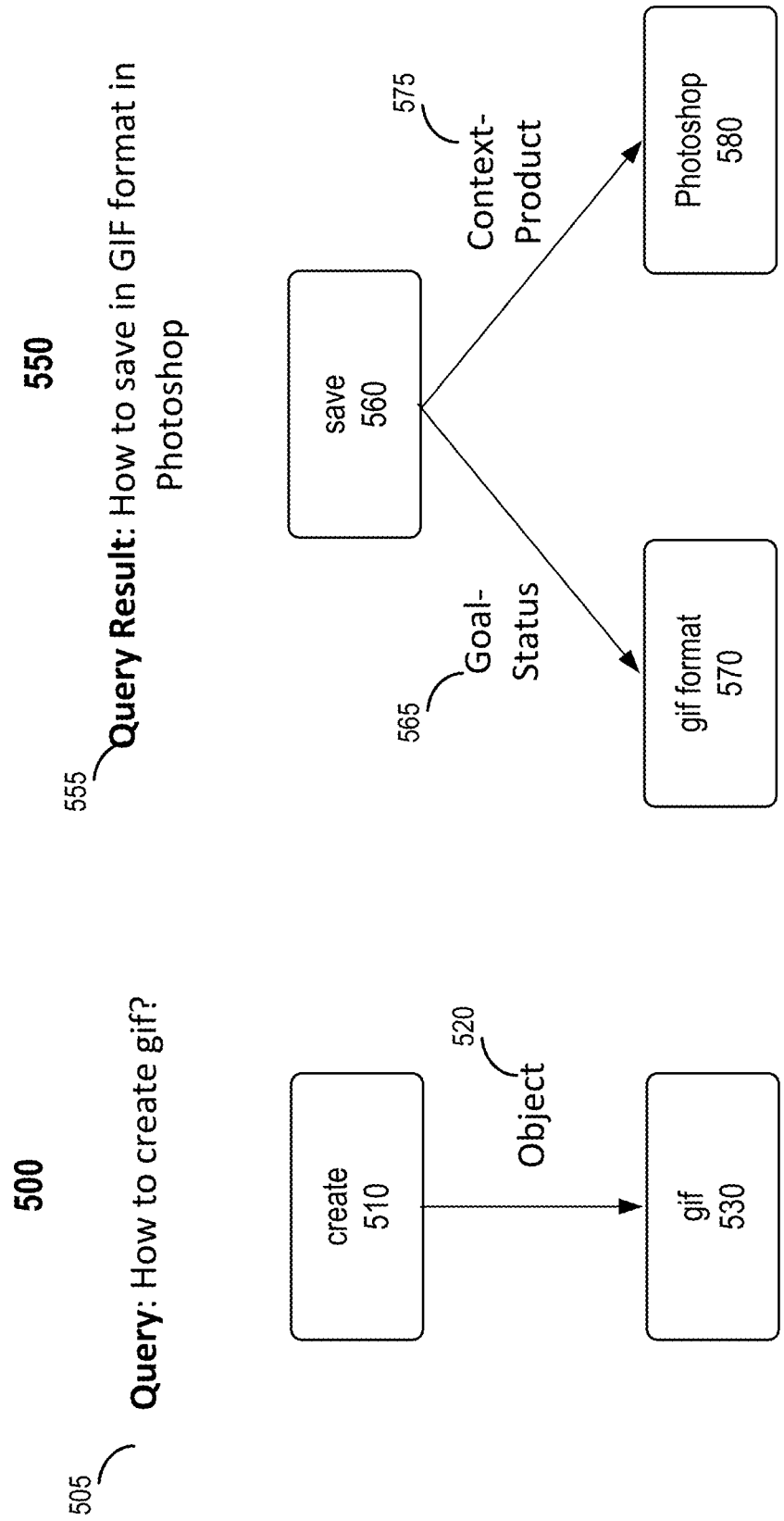

| query | pagename | freq |
|---|---|---|
| how do i enable adobe flash player | helpx.adobe.com/flash-player-xb-enabling-flash-... | 409 |
| how do i enable adobe flash player in chrome | helpx.adobe.com/flash-player-xb-enabling-flash-... | 361 |
| how to delete a page | helpx.adobe.com/acrobat-using-manipulating-de-... | 397 |
| how to redact a pdf | helpx.adobe.com/acrobat-using-removing-sensit-... | 360 |
| how to delete pages | helpx.adobe.com/acrobat-using-manipulating-de-... | 248 |
| how to cancel | helpx.adobe.com/creative-cloud-help-cancel-me-... | 243 |
| how to redact a pdf | helpx.adobe.com/acrobat-11-using-removing-sel-... | 222 |
| how to cancel | helpx.adobe.com/document-cloud-help-cancel-sa-... | 198 |
| how to redact | helpx.adobe.com/acrobat-using-removing-sensit-... | 153 |
| how do i delete a page | helpx.adobe.com/acrobat-using-manipulating-de-... | 151 |
| how to password protect a pdf | helpx.adobe.com/acrobat-using-securing-pdfs-p-... | 129 |
| how to bar a document | helpx.adobe.com/document-cloud-help-using-oc-... | 127 |
| how do i enable adobe flash player | helpx.adobe.com/flash-player-xb-flash-issues-windows... | |

FIG. 6

| URL<br>Query | URL 1 | URL 2 | URL 3 | ... |
|---|---|---|---|---|
| Query 1 | 409 | | | |
| Query 2 | 391 | | | |
| Query 3 | | 387 | | |
| Query 4 | | | 300 | |
| ⋮ | | | | |

```
[('create a flyer in photoshop', 'creating a flyer', 1.0),
 ('using a scanner', 'acquiring images', 1.0),
 ('using a scanner', 'acquiring images from cameras', 1.0),
 ('acquiring images from cameras and scanners', 'using a scanner', 1.0),
 ('acquiring images from cameras and scanners', 'acquiring images', 1.0),
 ('acquiring images from cameras and scanners', 'acquiring images from cameras', 1.0),
 ('matching colors', 'match color in photoshop', 1.0),
 ('acquiring images', 'acquiring images from cameras', 1.0),
 ('convert to rgb mode', 'convert image to rgb color mode', 0.9999999999999989),
 ('create new action', 'creating actions', 0.9999999999999989),
 ('create custom shape', 'create custom shape', 0.9999999999999978),
 ('create background layer', 'make background layer', 0.9999999999999978),
 ('flip selection', 'flip layer horizontal', 0.9999999999999978),
 ('flip selection', 'how to flip a layer', 0.9999999999999956),
 ('flip layer horizontal', 'making layers', 0.9999999999999867),
 ('adding a new layer', 'how to flip a layer', 0.9999999999999956),
 ('restoring workspace', 'setting up workspace', 0.9999999999982547)]
```

SEMANTIC ANALYSIS-BASED QUERY RESULT RETRIEVAL FOR NATURAL LANGUAGE PROCEDURAL QUERIES

TECHNICAL FIELD

This application relates generally to natural language query systems or platforms. More specifically, this application relates to semantic analysis-based query result retrieval for natural language queries regarding certain procedures, where the dependency or other relationship between terms in a natural language query, rather than merely the individual terms in the natural language query, is used to retrieve query results.

BACKGROUND

Query answering (QA) relates to using a computer system to provide query results for natural language queries to users. A QA system provides query results by, for example, querying a structured database of knowledge or information or by pulling query results from unstructured collections of natural language documents. The queries can include factual queries or procedural queries. Factual queries involve, for example, "who," "what," and "when" questions, such as "who was the president of United States in 2000?" Since these queries can generally be serviced using some combinations of keywords, such as "president" AND "United States" AND "2000," answers to factual queries can be discrete and short, such as an identification of an object (e.g., "Bill Clinton"). Procedural queries involve the "how" questions. For example, procedural queries could request information on how to use a certain hardware or software product or how to perform a certain function or operation, such as "how can I add watermark in an image?" Unlike factual queries, an answer to a procedural query often includes narrative text that includes a subjective opinion or an informative description. QA systems automate processes that would be time-consuming and costly to address with human operators, such as customer service or technical support personnel.

A procedural QA system generally receives queries that include natural language phrases, rather than a set of keywords, which allows the procedural QA system to service queries that require a less rigid structure or a less precise set of keywords as compared to factual QA systems. However, the natural language queries also make the QA system more difficult to implement due to variation in query type, ambiguities in natural language, etc. In addition, for procedural QA, the queries often include long sentences. The QA system not only needs to understand the individual terms in a natural language query, but also needs to understand the context, such as the dependency or other relationship between the terms in the natural language query. This requirement increases the difficulty of configuring a computing system to correctly service natural-language queries involving procedural questions. For instance, a computing system that implements QA must be programmed in a manner that accounts for exceptional cases involving variations in how certain grammatical terms are used, sentence structures susceptible to more than one meaning, etc. Thus, certain existing information retrieval techniques, which try to match individual terms independently and ignore the context of these terms (e.g., term frequency-inverse document frequency or BM25 approaches), are not suitable for natural language queries that each include a complex linguistic structure and have dependency between individual terms in each query.

Furthermore, existing techniques for configuring QA systems to account for natural language phrases present disadvantages. For instance, a machine-learning approach could use a large training dataset to build and train a model that transforms various natural language phrases into formatted queries. But these techniques are not suitable for cold-start situations where a sufficient amount of training data is unavailable.

SUMMARY

Embodiments of the present disclosure involve using a computer system to retrieve query results for natural language queries regarding certain procedures. According to certain embodiments, a computer-implemented method for retrieving a query result for a natural language query (e.g., a procedural query) includes generating a query semantic representation for the natural language query received from a user device, where the query semantic representation indicates a relationship between terms in the natural language query. The method also includes retrieving a set of candidate query results for the natural language query from a query result repository, and generating a result semantic representation for a candidate query result from the set of candidate query results, where the result semantic representation indicates a relationship between terms in the candidate query result. The method further includes determining a match score between the natural language query and the candidate query result based on the query semantic representation and the result semantic representation, selecting the candidate query result as the query result for the natural language query based on the match score being higher than other match scores computed for other candidate query results from the set of candidate query results, and sending the query result to the user device.

In some embodiments, each of the query semantic representation and the result semantic representation includes one or more triples in a form of (action, role, value), where the action in each triple includes an action term in the natural language query or the candidate query result, the value in each triple includes a term in the natural language query or the candidate query result, and the role in each triple indicates a role of the value with respect to the action. In some embodiments, the method further includes, for each triple in the result semantic representation, determining an alignment score between the triple in the result semantic representation and a triple in the query semantic representation based on a set of rules. In some embodiments, determining the match score between the natural language query and the candidate query result includes determining a first weighted average of alignment scores for the one or more triples in the query semantic representation, determining a second weighted average of alignment scores for the one or more triples in the result semantic representation, and determining an average of the first weighted average and the second weighted average, where the average corresponds to the match score between the natural language query and the candidate query result.

In some embodiments, the method further includes extracting a set of paraphrasing rules from user interaction data associated with a website. The user interaction data includes, for each query in the user interaction data, a frequency that a website is visited by users after the query. Each paraphrasing rule includes two triples representing a pair of paraphrases and a similarity score between the two triples. The set of paraphrasing rules is part of the set of rules used for determining the alignment score between a triple in the result semantic representation and a triple in the query semantic representation.

These illustrative examples are mentioned not to limit or define the disclosure, but to provide examples to aid understanding thereof. Additional embodiments and examples are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

FIG. 5A illustrates an example of a semantic representation of a procedural question according to certain embodiments. FIG. 5B illustrates an example of a semantic representation of a title of a query result for the procedural question of FIG. 5A according to certain embodiments.

FIG. 6 illustrates an example of user interaction data used for paraphrase mining according to certain embodiments.

FIG. 7 illustrates an example of a frequency matrix generated from user interaction data according to certain embodiments.

FIG. 8 illustrates examples of query-to-query similarity scores according to certain embodiments.

FIG. 11 illustrates examples of paraphrasing rules extracted from user interaction data according to certain embodiments.

DETAILED DESCRIPTION

Figure 1A:
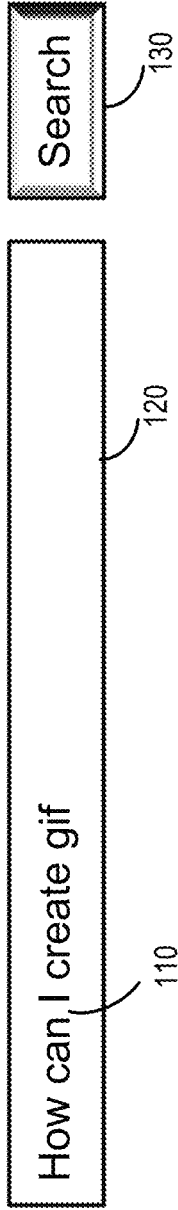
FIG. 1A illustrates an example of a procedural question in a natural language.

Embodiments disclosed herein involve servicing natural language queries based on a semantic analysis that indicates dependency between terms in a natural language query, rather than merely based on the individual terms in the natural language query. As explained above, existing query answering (QA) systems fail to accurately service natural language queries (as opposed to keyword-based queries), where the meaning of the query often depends heavily on the meaning conveyed by a combination of query terms in a particular sentence structure. Certain embodiments described herein can address this problem by using the relationship or dependency between query terms to match the query to one or more corresponding data objects.

The following example is used to introduce certain embodiments in which a QA system uses a semantic analysis technique to match a query to query results based on dependencies between natural language terms. In this example, the QA system generates a structured semantic representation of the natural language query that includes terms in the query as well as a dependency between the terms. An example of this structured semantic representation is a triple (e.g., ("create," Object, "gif")) that includes two terms used in the natural language query (e.g., terms "create" and "gif" in the query "how to create gif?") and a relationship between the two terms (e.g., "gif" is the object of "create" in "how to create gif?"). Based on the natural language query, the QA system retrieves a set of candidate query results from a query result repository (e.g., a database) using, for example, keyword-based searching techniques, query expansion techniques, or other information retrieval techniques. The QA system then generates structured semantic representations (e.g., triples) for the candidate query results, and computes a match score between the natural language query and a given candidate query result based on these semantic representations. Based on the match score between the natural language query and each candidate query result, one or more candidate query results with the highest match score can be selected as the query result.

For instance, the QA system aligns a semantic structure (e.g., a triple ("create," Object, "GIF")) representing the natural language query with a semantic structure (e.g., a triple ("save," Goal-Status, "gif format")) representing the candidate query result (e.g., "save in gif format in Photoshop") to determine an alignment score between the two semantic structures based on, for example, the similarity between each pair of corresponding elements in the two semantic structures. When the semantic representation of the natural language query or the candidate query result includes more than one semantic structure, such as ("save," Goal-Status, "gif format") and ("save," Context Product, "Photoshop") for candidate query result "save in gif format in Photoshop," more than one alignment score is determined, such as one alignment score between triple ("create," Object, "GIF") and triple ("save," Goal-Status, "gif format") and another alignment score between triple ("create," Object, "GIF") and triple ("save," Context Product, "Photoshop"). The QA system then applies a scoring function on the more than one alignment score to determine the match score between the natural language query and the given candidate query result.

Compared with existing techniques, techniques disclosed herein can more accurately match natural language queries and candidate query results using in-depth language analysis and structured semantic representations. The techniques do not need to use any machine learning-based model and thus do not require a ground truth training dataset to train the machine learning-based model. Therefore, the techniques disclosed herein are robust even in cold-start cases. In cases where ground truth training data is available, the techniques disclosed herein can also use some machine learning techniques to further improve the performance of the QA system.

In some embodiments, a paraphrase mining technique is used to generate paraphrasing rules from user interaction data. Each paraphrasing rule includes structured semantic representations of two user queries and a similarity score between the two structured semantic representations. The paraphrasing rules can be used to more accurately align the semantic structures and determine the similarity between user queries and candidate query results, thereby further improving the accuracy of natural language query result retrieval, in particular, in cases where the user query and the query result have a same meaning but are expressed in different ways.

As used herein, the term "natural language" refers to an expression, such as one or more sentences, clauses, or phrases, of a human language (e.g., English), where linguistic elements (e.g., words) are arranged in a certain sequence according to the syntax and grammar of the human language to convey a certain meaning that can be understand by a person.

As used herein, the term "natural language query" refers to a query in a natural language, such as a sentence or a long phrase, rather than merely a set of one or more keywords. The meaning of a natural language query often depends on not only the individual terms in the natural language query but also the dependency or other relationship between the individual terms. In some examples, the natural language query relates to how to use a hardware or software product or how to perform a certain function or operation, which is often referred to as a procedural query or, more specifically, a procedural question.

As used herein, the term "semantic representation" or "structured semantic representation" refers to a data structure that describes terms in a natural language query or query result and the dependency or other relationship between the terms. In some examples, a semantic representation includes a tree structure that includes one or more branches (or edges) in one or more layers, where each branch or edge of the semantic representation is referred to as a "semantic structure." In some examples, a semantic structure is in a form of a triple that includes three elements, such as two elements representing two terms in a natural language query and a third element representing the relationship between the two terms. In some examples, a semantic structure includes more than three elements.

As used herein, the term "dependency" refers to a relationship between terms in a natural language expression where individual terms depend on each other or serve as the context for each other in order to convey a certain meaning.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as an "example" is not necessarily to be construed as preferred or advantageous over other embodiments or designs.

FIG. 1A illustrates an example of a procedural question 110 asked in a natural language. Procedural question 110 can be asked by a user through a user interface of a user device or a computing system, such as a display, a keyboard, a mouse, a microphone, or a touch screen. In one example, the user can enter the question in a search box 120 using a keyboard or using an audio recorder (e.g., a microphone), and then click a button 130 to submit the query. Procedural question 110 includes a sentence in a natural language. In the example illustrated in FIG. 1A, the question asks "How can I create gif," which includes a complete sentence in English, rather than discrete keywords.

Figure 1B:
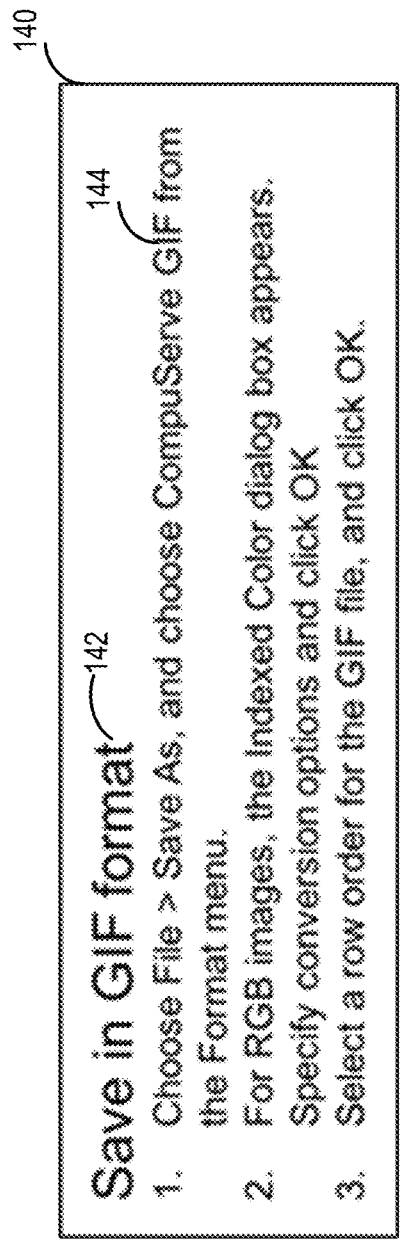
FIG. 1B illustrates an example of an answer card that is an answer to the procedural question of FIG. 1A.

FIG. 1B illustrates an example of a query result 140 (in the form of an answer card) found by a QA system as an answer to procedural question 110 of FIG. 1A. Query result 140 is retrieved from a query result repository. Query result 140 includes a title 142 and a body 144. Title 142 is generally a short description of the subject matter of query result 140. Body 144 provides detailed answers (e.g., procedures) to the user's question. Body 144 can include long texts, such as one or more paragraphs. The QA system can retrieve query result 140 from the query result repository and present it to the user as an answer to procedural question 110.

As described above, information retrieval techniques, such as term frequency-inverse document frequency (TF-IDF) or BM25, have been used for QA. These techniques generally assume independency between query terms (e.g., words), and score the query terms independently without considering its context. Thus, these techniques also assume that the match score of each query term against a candidate query result is independent of its contexts, ignoring the dependency between terms in the query or the candidate query result. This independency assumption can be valid when the query terms include a list of independent keywords, but would often cause a poor accuracy when the question asked includes a complex linguistic structure, where elements of the structure are interrelated. Due to the independency assumption, these techniques may perform well for keyword-centric searches, such as document retrieval based on independent keywords. However, these techniques may perform poorly when the queries include a complex linguistic structure, such as a procedural question. Thus, these techniques may not be suitable for handling queries that are long and have a complex linguistic structure, such as the procedural questions.

Data from community question answering forums (e.g., Yahoo Answer!, Quora, and Adobe's question answering forum) have been used by procedural QA systems to provide answers to user queries. In these community QA forums, users can post any question including procedural queries, such as troubleshooting questions and procedural questions, which are then answered by other users. The procedural queries along with the answers from these community QA forums have been a major resource for procedural QA systems. For example, a QA system can first retrieve previously asked questions similar to a new question from questions asked in these community QA forums. Once the previously asked questions matching the new question are retrieved, the answers associated with them could be presented to the user as an answer to the user's new question. The questions and answers in the community QA forums are often informally written (e.g., using incorrect grammar), making it difficult to apply in-depth natural language process technologies on the questions or answers. Thus, techniques developed for the community QA forums often only analyze the texts at the lexical level (e.g., word level) and avoid analyzing the complex linguistic structure of the queries or query results.

Some QA techniques use plain texts as the information source and attempt to identify a short span of texts that may include an answer. For example, some techniques employ a scoring function to compute the score of the span with respect to a question. These techniques generally use ground truth pairs (e.g., question and answer span pairs) to train an information retrieval system using machine learning techniques. Such machine learning-based information retrieval systems often use a large amount of training data that includes a large number of pairs of ground-truth questions and answers to train a model. However, when an information retrieval system is first launched, the training data is often rarely available, and thus the performance of the information retrieval system can be very low as the information retrieval system has not been well trained. This is often referred to as a cold-start issue.

Some QA systems use dependency structure models to identify the syntactic dependency structure of a given query. By modelling the dependency structures, these systems can exclude documents that may include the query terms but are semantically different from the query. However, these QA systems also use ground-truth question/answer pairs as a training dataset to build the models.

According to certain embodiments, a semantic analysis-based procedural natural language QA system can perform semantic analysis on the user query (question) and candidate query results (more specifically, the titles of the candidate query results) that are both in a natural language to generate structured semantic representations of the user query and the candidate query results. The structured semantic representation of the user query (or a candidate query result) includes one or more semantic structures that describe terms in the user query (or a candidate query result) and the relationship between the terms. For example, each semantic structure in the structured semantic representation of the user query can be in a form of a triple that includes two terms used in the user query and the relationship between the two terms. In some embodiments, the candidate query results are retrieved from a pre-built query result repository, where each query result in the query result repository includes a query result excerpted from an official document written by professionals (e.g., product manuals and official help websites) or is specifically written for the QA system by professionals, rather than a short span of texts extracted from a document. These query results are formally written and thus are grammatical, allowing the in-depth semantic analysis to be performed on them.

The QA system can then score the candidate query results using the structured semantic representations, and select one or more candidate query results associated with the highest scores as the query result for the user query. In some embodiments, the QA system aligns the semantic structures (e.g., the triples) in the structured semantic representation for the user query with the semantic structures in the structured semantic representation for the candidate query result. For example, the alignment can be based on the similarity between corresponding elements in two semantic structures (e.g., two triples). The QA system then uses a scoring function to determine the match between the user query and the candidate query result based on the alignment of the semantic structures.

In some cases, the use query and a candidate query result may have a same meaning but may be expressed in different ways. According to certain embodiments, a paraphrase mining technique is used to extract paraphrasing rules from user interaction data, where each paraphrasing rule includes structured semantic representations of a pair of similar queries and the associated similarity score. In some embodiments, the paraphrasing rules (including the similarity score between the paraphrases) are used to score the candidate query results with respect to the user query.

The techniques disclosed herein can more accurately determine the matching between a natural language query and the candidate query results using in-depth language analysis, rather than merely matching keywords. The techniques do not require a ground truth training dataset and thus are robust even in cold-start cases. In cases where the ground truth training data is available, the techniques disclosed herein can also use machine learning techniques to further improve the performance of the information retrieval system. In addition, the paraphrasing rules extracted from the user interaction data can further improve the accuracy of procedural QA, in particular, for cases where the user query and the candidate query result have a same meaning but are expressed in different ways.

According to certain embodiments, a QA system maintains a query result repository that includes a large number of query results (e.g., in the form of answer cards). When a user submits a query, the QA system first retrieves multiple candidate query results from the query result repository. The QA system determines a match score for each of the candidate query result with respect to the user query. A candidate query result associated with the highest match score is selected from the candidate query results. If the selected query result has a match score greater than a threshold value, the selected query result is provided to the user (e.g., sent to the user device) as the query result for the user's query.

Figure 2:
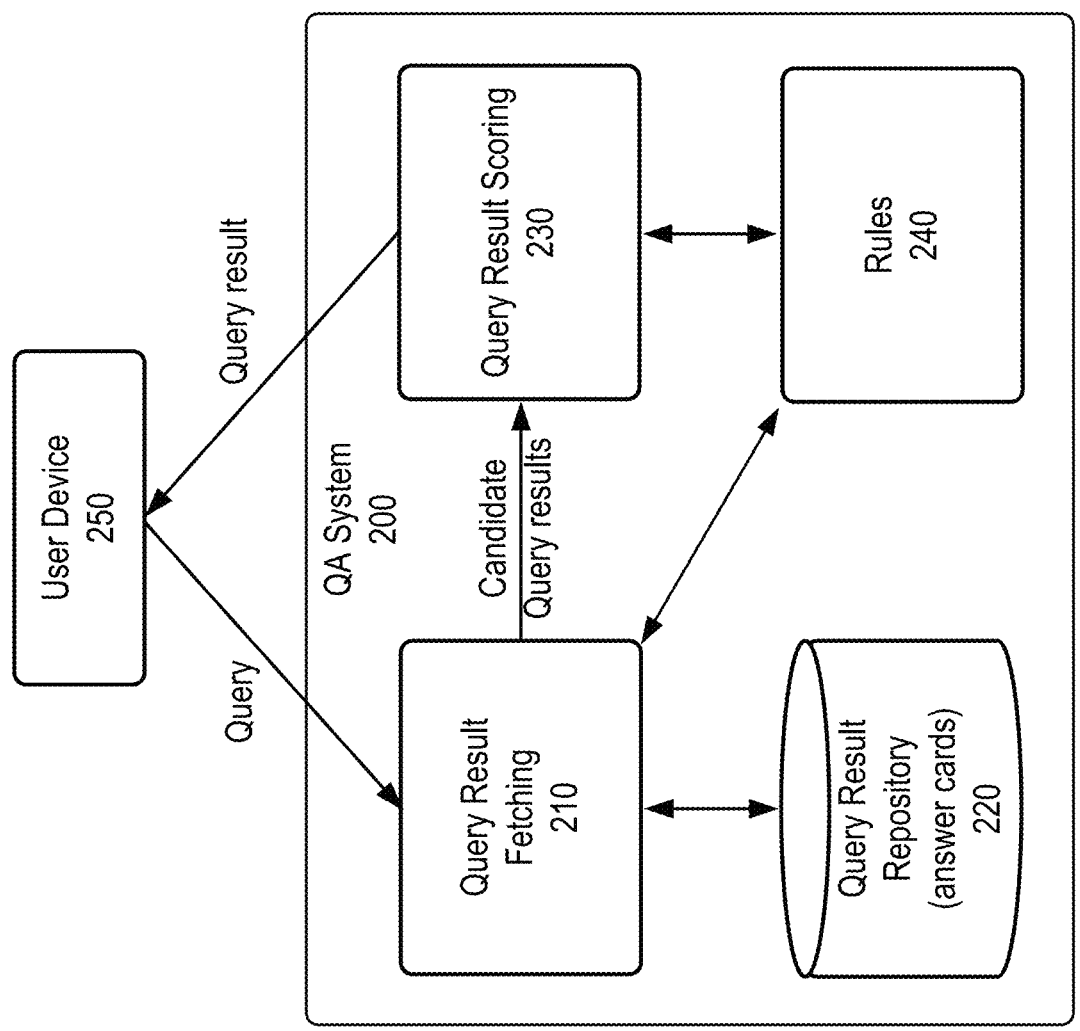
FIG. 2 is a simplified block diagram of an example of a query answering system according to certain embodiments.

FIG. 2 is a simplified block diagram of an example of a QA system 200 according to certain embodiments. Query answering system 200 includes a query result fetching subsystem 210, a query result repository 220, a query result scoring subsystem 230, and a rule store 240. When QA system 200 receives a user query in a natural language from a user device 250 (e.g., a computer, a mobile device, etc.), query result fetching subsystem 210 retrieves multiple (e.g., N) candidate query results from query result repository 220 using, for example, keyword-based searching based on terms in the query and terms in the query result (e.g., terms in the title of the query result). As described above, query result repository 220 includes query results that are excerpted from official documents written by professionals (e.g., product manuals and official help websites) or query results that are specifically written for the QA system by professionals, rather than informal answers from data sources such as community QA forums. In some embodiments, query result fetching subsystem 210 retrieves the candidate query results based on certain rules stored in rule store 240. For example, in some embodiments, query expansion techniques are used to search the candidate query results based on certain rules stored in rule store 240 in order to ensure that a correct query result, if existing in query result repository 220, would be included in the fetch. In various embodiments, according to the rules stored in rule store 240, synonyms of words can be used for the search, various morphological forms of words can be used for the search, and spelling errors in the query can be fixed and the corrected words can be used for the search. In some embodiments, the candidate query result search is based on the titles of query results in query result repository 220. In some embodiments, to expand the search, the candidate query result search is based on the full content of the query results, rather than only the titles of the query results.

Query result scoring subsystem 230 compares each candidate query result against the user query, computes the match score of each candidate query result, selects the candidate query result associated with the highest match score as the query result for the user query if the selected query result meets certain criteria, and sends the query result to user device 250. In some embodiments, query result scoring subsystem 230 performs semantic analysis on the user query and each of the candidate query results (more specifically, the title of each candidate query result) to represent the user query and the candidate query results using, for example, structured sematic representations that include certain terms in the user query or the candidate query results and the relationship or dependency between the terms. A user query or a candidate query result can be represented by one or more semantic structures, where each of the multiple semantic structures is associated with a different weight. Query result scoring subsystem 230 then aligns the semantic structures that represent the user query and each candidate query result and determines the match between the user query and each candidate query result based on the alignment of the semantic structures. In some embodiments, various rules stored in rule store 240, such as alignment rules and paraphrasing rules described in detail below, are used to score the candidate query results, such as aligning the semantic structures and determining a match score between the user query and each candidate query result.

Figure 3:
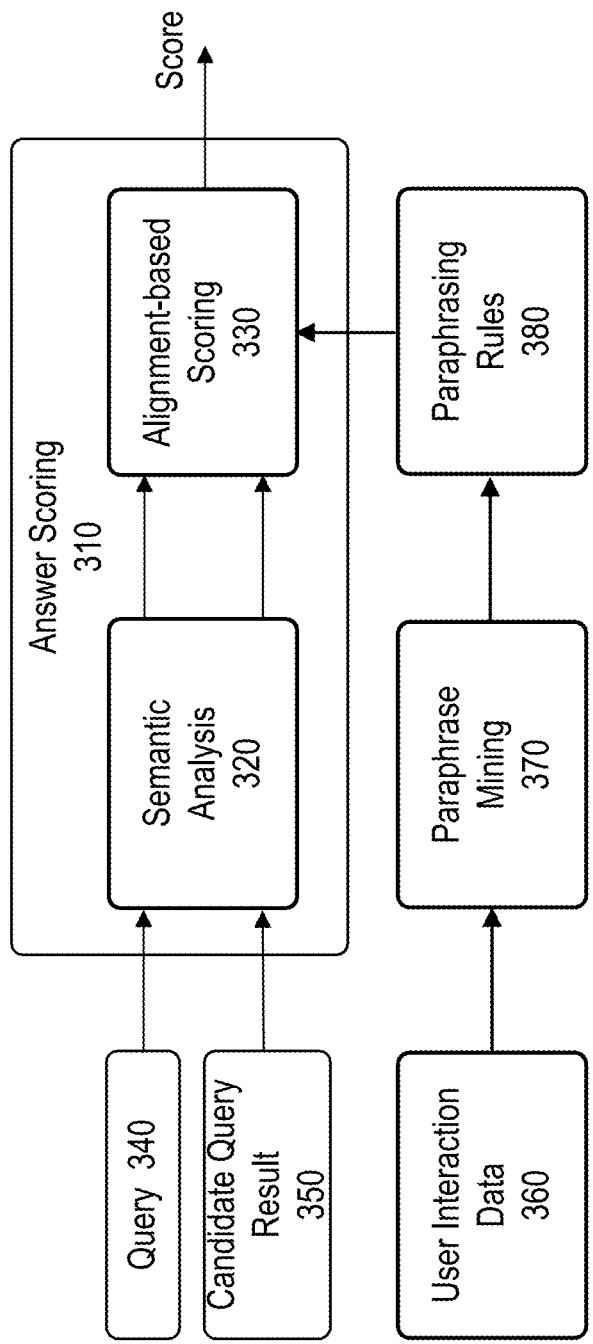
FIG. 3 illustrates an example of a query result scoring subsystem of a query answering system according to certain embodiments.

FIG. 3 illustrates an example of a query result scoring subsystem 310 of a QA system, such as query result scoring subsystem 230, according to certain embodiments. As illustrated in the example, query result scoring subsystem 310 includes a semantic analysis engine 320 and an alignment-based scoring engine 330. Semantic analysis engine 320 takes two inputs, a query 340 and a candidate query result 350 (or the title of candidate query result 350). Both query 340 and candidate query result 350 are written in a natural language. As described above, candidate query result 350 can be retrieved from a query result repository, where the query results in the query result repository are excerpted from official documents written by professionals (e.g., product manuals and official help websites) or are query results that are written specifically for the QA system by professionals, rather than informal answers from data sources such as community QA forums. Thus, the query results, including the titles and the bodies of the query results are suitable for in-depth semantic analysis as described below.

Semantic analysis engine 320 converts a natural language query and the title of a candidate query result into their respective structured semantic representations. There are different ways to structurally represent the query and the title of the candidate query result. In one example, the semantic representation of a query or a title of a candidate query result includes a semantic structure that describes key terms and the relationship (or dependency) between the key terms in the query or the title of the candidate query result. In one specific example, each semantic representation includes an action, a value, and a role of the value in the form of a triple (action, role, value), such as ("create," object, "GIF"). In some cases, a query or a title of a candidate query result can be represented by two or more semantic structures, such as two or more triples. More details of the semantic analysis are described below.

Alignment-based scoring engine 330 aligns the semantic representations for the query and the title of the candidate query result, determines an alignment score between each semantic structure in the semantic representation for the query and each semantic structure in the semantic representation for the title of the candidate query result, and calculates a match score between the query and the title of the query result based on the alignment scores. For example, if the semantic representation of the query and the semantic representation of the title of the query result have the same triples, the semantic representations of the query and the title of the candidate query result are perfectly aligned and the match score between the query and the title of the candidate query result is "1." More details of the process of alignment-based scoring are described below.

In some cases, the title of a candidate query result includes a paraphrase of the query. As such, the semantic representations of the query and the title of the candidate query result may not be perfectly aligned, and thus the match score may be a number less than "1." In some embodiments, a similarity score between two paraphrases is determined by a paraphrase mining engine 370. For example, paraphrase mining engine 370 can find paraphrases from user interaction data 360 associated with a website or a webpage, such as the question-and-answer (Q&A) page or the help or technical support site of a commercial product. User interaction data 360 can include, for example, queries asked by users and the links the users clicked after the queries. In one example, user interaction data 360 includes web-search click data that maps user queries to the clicked websites. Paraphrase mining engine 370 can identify paraphrases based on query-to-query similarity, generate semantic representations for the paraphrases, and generate paraphrasing rules 380, which include semantic representations of paraphrases and similarity scores (e.g., between −1 and 1 or between 0 and 1) determined based on query-to-query similarity scores. Alignment-based scoring engine 330 can then use paraphrasing rules 380 to score the candidate query results. For example, alignment-based scoring engine 330 can use the similarity score associated with a paraphrasing rule that includes semantic representations similar to the semantic representation of the query and the title of the candidate query result to determine the match score between the query and the title of the candidate query result as described in detail below.

In some embodiments, paraphrase mining engine 370 is not a part of query result scoring subsystem 310. Paraphrase mining engine 370 generates paraphrasing rules 380 based on user interaction data 360, and stores paraphrasing rules 380 in a list, a table, or a database. Paraphrasing rules 380 can be retrieved by alignment-based scoring engine 330 when needed.

Figure 4:
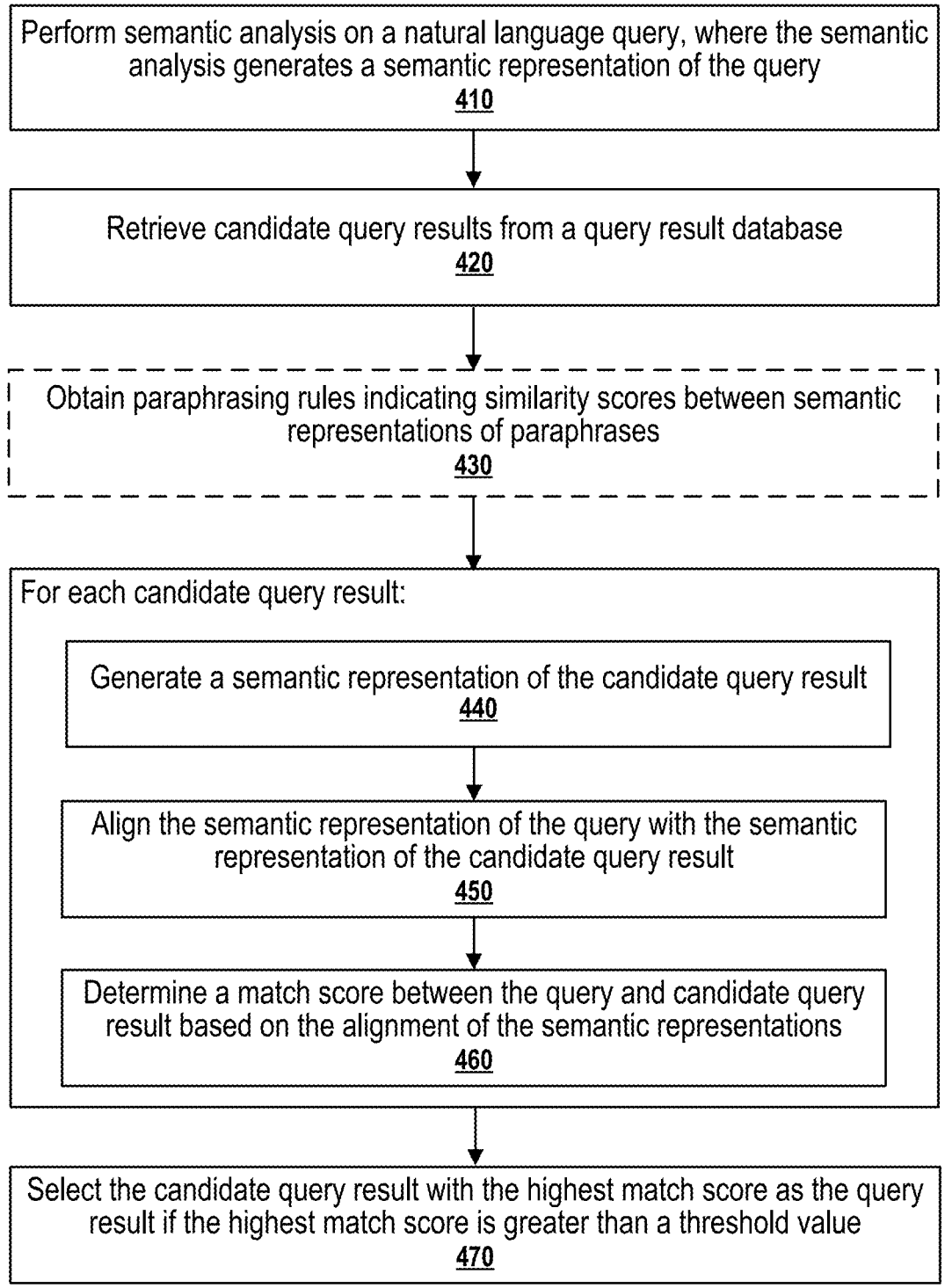
FIG. 4 illustrates an example of a method of retrieving query results for natural language queries according to certain embodiments.

FIG. 4 is a flow chart 400 illustrating an example of a method of retrieving query results for natural language queries according to certain embodiments. Operations in flow chart 400 can be performed by, for example, QA system 200, query result scoring subsystem 310, or computing system 1200 described below with respect to FIG. 12.

At block 410, a QA system (e.g., QA system 200) receives a user query. The user query is in a natural language, such as a sentence or long phrase in English. A semantic analysis engine of the QA system (e.g., semantic analysis engine 320) generates a structured semantic representation of the user query. The structured semantic representation of the user query includes keywords or terms in the user query and the relationship, dependency, or interaction between the keywords. For example, in some embodiments, the structured semantic representation includes one or more semantic structures, such as triples in the form of (a, r, v), where a represents an action word (e.g., a verb) in the user query, v represents a term in the user query indicating an object, manner, status, context, etc. associated with the action, and r represents a role describing a relationship, dependency, or interaction between a and v. The semantic analysis engine can be rule-based, machine-learning model-based, or a combination thereof. More details of the semantic analysis are described below.

At block 420, a query result fetching subsystem (e.g., query result fetching subsystem 210) retrieves multiple (e.g., N) candidate query results (e.g., in the form of answer cards) from a query result repository (e.g., query result repository 220) using, for example, keyword-based searching based on keywords in the user query. In some embodiments, the keywords are identified by the semantic analysis engine as described above. In some embodiments, query expansion techniques as described above are used to ensure that a correct query result, if existing in the query result repository, would be included in the candidate query results.

Optionally, at block 430, a query result scoring engine (e.g., alignment-based scoring engine 330) obtains paraphrasing rules indicating similarity scores between semantic representations of paraphrases. For example, the query result scoring engine can obtain predetermined paraphrasing rules stored in a list, a table, or a database. As described above with respect to FIG. 3, the paraphrasing rules can be determined in advance and stored in a list, a table, or a database by, for example, paraphrase mining engine 370 using user interaction data 360 associated with a website or a webpage, such as the question-and-answer page or the help or technical support site of a commercial product. The paraphrasing rules include semantic representations of paraphrases and the associated similarity score (e.g., between −1 and 1 or between 0 and 1).

The QA system then scores each of the candidate query results against the user query at blocks 440-460 and selects one or more candidate query results with the highest score(s) as the query result for the user's query at block 470.

At block 440, a semantic analysis engine (e.g., semantic analysis engine 320) performs semantic analysis on each candidate query result to generate a semantic representation of the candidate query result. In some embodiments, the semantic analysis engine performs the semantic analysis on the title of the candidate query result. In some embodiments, the semantic analysis engine performs the semantic analysis on at least a portion of the body of the candidate query result. In some embodiments, the semantic representation includes one or more semantic structures, such as triples in the form of (a, r, v), where a represents an action, r represents a role, and v represents a value, as described above. The semantic analysis engine uses a rule-based technique, a machine-learning-based technique, or a combination of rule-based technique and machine-learning-based technique to perform the semantic analysis. More details of the semantic analysis are described below.

At block 450, the query result scoring engine aligns the semantic representation of the query with the semantic representation of the candidate query result using certain rules to determine matched and unmatched semantic structures. For example, the query result scoring engine can align each of one or more triples generated from the query with each of one or more triples generated from the title of the candidate query result. In some embodiments, an alignment score is generated for each triple of the one or more triples for the candidate query result. In some embodiments, the query result scoring engine uses the paraphrasing rules to align the semantic representations and generate the alignment score. More details of the semantic representation alignment are described below.

At block 460, the query result scoring engine determines a match score between the query and the candidate query result based on the alignment of the semantic representations. In some embodiments, based on the alignment score between each triple in the semantic representation of the query and each triple in the semantic representation of the candidate query result, the query result scoring engine determines the overall match score between the query and the candidate query result as a function of a weighted average of the alignment scores for the query and a weighted average of the alignment scores for the candidate query result. Examples of methods for determining the overall match score between the query and the candidate query result are described in detail below.

At block 470, the QA system selects a candidate query result with a highest match score. If the match score of the selected candidate query result is greater than a threshold value, the QA system presents the selected candidate query result as a query result for the user's query. Otherwise, the QA system returns a message, such as "no answer found," to the user device to indicate that no query result can be found from the query result repository with a sufficiently high confidence level.

Figure 12:
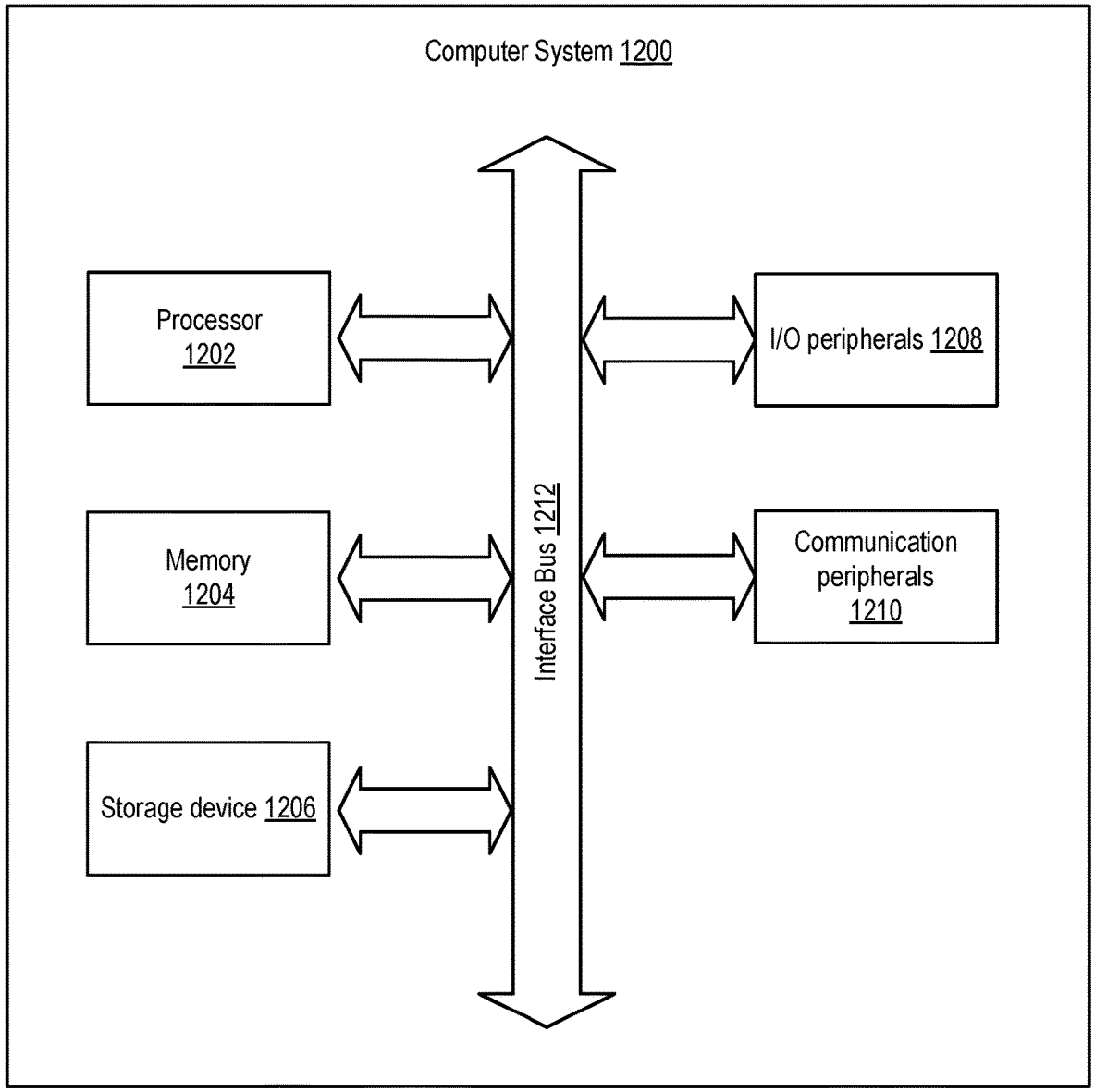
FIG. 12 illustrates an example computer system for implementing some of the embodiments disclosed herein.

A computing system, such as one including computing system 1200 of FIG. 12, can be configured to perform the illustrative flows using machine-readable instruction in some embodiments. Instructions for performing the operations of the illustrative flows can be stored as computer-readable instructions on a non-transitory computer-readable medium of the computer system. As stored, the instructions represent programmable modules that include code or data executable by a processor(s) of the computer system. The execution of such instructions configures the computer system to perform the specific operations shown in the figures and described herein. Each programmable module in combination with the processor represents a means for performing a respective operation(s). While the operations are illustrated in a particular order, it should be understood that no particular order is necessary and that one or more operations may be omitted, skipped, and/or reordered. For example, in some embodiments, the operations at block 410 and block 420 are reordered.

As described above, the QA system uses semantic representations generated by a semantic analysis engine (e.g., semantic analysis engine 320) to determine the matching between the query and the candidate query result. For example, the semantic representation for a phrase or sentence includes one or more semantic structures, such as triples. As described above, each triple includes an action, a value, and a semantic role of the value with respect to the action. In some embodiments, the semantic representation includes one or more complex semantic structures that each include more than three elements.

In one embodiment where the QA system is used to answer queries regarding how to use a product (e.g., Adobe Photoshop®), five semantic roles are used to describe the possible roles of the values with respect to the action as shown in Table 1. It is noted that the examples of roles shown in Table 1 are for illustration purposes only and are not intended to be limiting. Many other types of roles can be defined. In one example shown in Table 1, a role is defined as an "Object," which indicates that the value following the role in the triple is the object of an action, such as "gif" in phrase "create gif". In a second example, a role is defined as a "Source Status," which indicates that the value following the role in the triple is the status of an item before the action is applied, such as "raw" in the phrase "convert image from raw to jpeg." In a third example, a role is defined as a "Goal_Status," which indicates that the value following the role in the triple is the status of an item after the action is applied, such as "transparent" in phrase "make background transparent." In a fourth example, a role is defined as a "manner," which indicates that the value following the role in the triple is the manner in which the action is taken, such as "adjustment layer" in phrase "change color tone using adjustment layer." In yet another example, a role is defined as a "Context_Product," which indicates that the value following the role in the triple is a product (e.g., a software application) in which the action is performed, such as "photoshop" in phrase "save in gif format in photoshop."

TABLE 1

Examples of roles in semantic representations of procedural questions

| Role Name | Explanation | Example |
| --- | --- | --- |
| Object | Object of an action | create gif |
| Source_Status | Status of an entity before action is applied | convert image from raw to jpeg |
| Goal_Status | Status of an entity after action is applied | make background transparent |
| Manner | A manner in which the action is taken | change color tone using adjustment layer |
| Context_Product | A product in which action is performed | save in gif format in photoshop |

FIG. 5A illustrates an example of a semantic representation 500 of a procedural question 505 according to certain embodiments. In the example shown in FIG. 5A, procedural question 505 asks "how to create gif?". Semantic representation 500 of procedural question 505 can include a graphic representation, such as a two-level tree structure, or can include a set of one or more triples, such as a triple ("create," Object, "value") including an action 510 ("create"), a value 530 ("gif"), and a role 520 (Object) of value 530 with respect to action 510.

FIG. 5B illustrates an example of a semantic representation 550 of a title 555 of a query result according to certain embodiments. In the example shown in FIG. 5B, title 555 of the query result is "How to save in gif format in Photoshop." Semantic representation 550 of title 555 can include a graphic representation, such as a two-level tree structure including two edges or branches. One edge of the tree structure includes an action 560 ("save"), a value 570 ("gif format"), and a role 565 ("Goal-Status") of value 570 in relation to action 560, which can also be represented by a triple ("save," Goal-Status, "gif format"). Another edge of the tree structure includes action 560 ("save"), a value 580 ("Photoshop"), and a role 575 ("Context_Product") of value 580 in relation to action 560, which can also be represented by a triple ("save," Context_Product, "Photoshop").

As described above, the semantic analysis engine can derive the semantic representations of a natural language text using a rule-based technique, a machine-learning-based technique, or a combination of a rule-based technique and a machine-learning-based technique. For example, one of the rules for semantic analysis is "if an action is 'save' and a noun is preceded by 'in', then the role of the noun is 'Goal_Status'." In some embodiments, a machine-learning-based model for semantic analysis is trained using a training dataset including queries or titles of query results annotated with the types of roles.

After the semantic representations (e.g., the triples as described above) of the user query and the title of the candidate query result are generated, a query result scoring engine (e.g., alignment-based scoring engine 330) determines the match score between the two semantic representations. In some embodiments, the match score is determined in two steps. First, the query result scoring engine aligns the two semantic representations to identify matched and unmatched semantic structures (e.g., triples). Second, the query result scoring engine calculates the overall match score between the semantic representations of the user query and the candidate query result based on the alignment of individual semantic structures. A detailed example of determining the match score between the user query and the candidate query result is described below.

During the semantic representation alignment, the query result scoring engine aligns the edges (e.g., triples) of the semantic representation of the query with the edges (e.g., triples) of the semantic representation of the candidate query result. An alignment score can be generated for each triple of the semantic representations. In some embodiments, the query result scoring engine uses rule-based techniques to align the edges of the semantic representations and determine the alignment score (degree of the alignment) for each edge.

In one example, a triple in the semantic representation of the query is $(a_q, r_q, v_q)$ and a triple in the semantic representation of the title of a query result is $(a_t, r_t, v_t)$ as described above. One rule used by the query result scoring engine is:

Rule 1: If $a_q$ is same as or a synonym of $a_t$, $r_q$ is same as $r_t$, and $v_g$ is same as or a synonym of $v_t$, the two triples are aligned and the corresponding alignment score is 1.

Rule 1 can be used to determine the alignment scores in cases where the two triples are the same as each other. Rule 1 can also be used to determine the alignment scores by matching synonymous words based on word-to-word synonym information, such as {"image," "photo," and "picture"}.

Another rule used by the query result scoring engine is:

Rule 2: If $(a_q, r_q, v_q)$ is a paraphrase of $(a_t, r_t, v_t)$ (e.g., the two triples are included in a paraphrasing rule), the two triples are aligned and the alignment score is the similarity score indicated by the paraphrasing rule.

Rule 2 can be used to determine the alignment scores in cases where the two triples are paraphrases. In one example, a paraphrasing rule includes a pair of paraphrases ("create," Object, "gif") and ("save," Goal_Status, "gif format") and a similarity score between the two triples. Thus, if a triple in the semantic representation of the query is ("create," Object, "gif") and a triple in the semantic representation of the query result title is ("save," Goal_Status, "gif format") or vice versa, the two triples are aligned with an alignment score corresponding to the similarity score between the two triples in the paraphrasing rule.

If a triple for the query (or the title of the query result) fails to be aligned with any triple for the title of the query result (or the query) according to Rule 1 and Rule 2, the alignment score for the triple would be assigned a value (e.g., −1 or 0) indicating that the triple fails to align with other triples.

The query result scoring engine uses the alignment scores of the aligned and the unaligned triples as described above to determine the overall match score between the semantic representation of the query and the semantic representation of the candidate query result. In some embodiments, because the triples could be different in term of their importance, the query result scoring engine treats each triple differently. For example, in the semantic representation of the title of the candidate query result shown in FIG. 5B, triple ("save," Object, "gif format") may be more important than triple ("save," Context_Product, "photoshop") because, if the semantic representation of the query does not include a triple mapped to ("save," Object, "gif format"), the candidate query result is unlikely to be a correct one. However, if the semantic representation of the query does not include a triple mapped to ("save," Context_Product, "photoshop"), the query result can still be a good query result for the query "how can I create gif?" Therefore, in some embodiments, different weights can be assigned to different triples to model the different impact of each triple.

As described above, each of the semantic representations of the query and the query result includes a set of triples, where each triple t of the set of triples is associated with a different weight(t) and a score(t). In some embodiments, weight(t) is a real number between 0 and 1, and score(t) is between −1 and 1. To determine the match score between the query and the candidate query result, the query result scoring engine combines the weighted alignment scores for all triples in a semantic representation for the query or the candidate query result to determine a match score for the query or the candidate query result, and then takes the average of the match score for the query and the match score for the candidate query result as the overall match score. For example, the overall match score can be determined as follows:

$$score_{query/answer} = \frac{\sum_{t \in triples} weight(t) * score(t)}{\sum_{t \in triples} weight(t)}, \text{ and}$$

$$score_{match} = \frac{1}{2}(score_{query} + score_{answer}).$$

The $score_{query}$ represents the match score of the semantic representation of the query, and is a weighted average of the alignment scores (e.g., score(t)) of all triples in the semantic representation of the query. Similarly, the $score_{answer}$ represents the match score of the semantic representation of the title of the query result, and is a weighted average of the alignment scores (e.g., score(t)) of all triples in the semantic representation of the candidate query result. The $score_{match}$ is an average of $score_{query}$ and $score_{answer}$, and represents the overall match score between the semantic representation of the query and the semantic representation of the candidate query result.

In some embodiments, the final match score between the semantic representation of the query and the semantic representation of the query result can be calculated using:

$$score_{final} = (1-\lambda)score_{match} + \lambda Score_{BM25},$$

where the final match score is a combination of two scores, $score_{match}$ and $score_{BM25}$. The $score_{BM25}$ is a score from a keyword-based search algorithm, such as BM25, and can be obtained through off-the-shelf libraries such as Lucene or ElasticSearch. The $score_{BM25}$ is used primarily to break the tie in cases where multiple competing query results have an equal overall match score $score_{match}$. λ is a small number (e.g., 0.00001), and thus $score_{BM25}$ has a minimum impact on $score_{final}$ other than breaking a tie.

In one specific example, the query and candidate query result are the same as the query and query result shown in FIGS. 5A and 5B. The semantic representations of the query and candidate query result, and the weight and score associated with each triple are shown in Table 2, which is used to determine the overall match score between the query and the candidate query result.

TABLE 2

Examples of triples of the query/query result and their weights and alignment scores

| Query Triple | Weight | Score | Query Result Triple | Weight | Score |
|---|---|---|---|---|---|
| ("create," Object, "gif") | 0.8 | 0.9 | ("save," Goal_Status, "gif format") | 0.95 | 0.9 |
| | | | ("save," Context_Product, "photoshop") | 0.3 | −1 |

The numbers shown in Table 2 are hypothetically made for illustration purposes. Triple ("create," Object, "gif") and triple ("save," Goal_Status, "gif format") both have a high weight (e.g., 0.8 or 0.95) and receive a high positive alignment score (e.g., 0.9) because they are aligned to each other through a paraphrasing rule. Triple ("save," Context_Product, "photoshop") has a lower weight 0.3 and a negative alignment score −1, because it is not aligned with any triple for the query. Therefore, the match score of the query and the candidate query result in the example can be determined by:

$$score_{query} = \frac{0.8 * 0.9}{0.8} = 0.9,$$

$$score_{answer} = \frac{0.95 * 0.9 + 0.3 * (-1)}{0.95 + 0.3} = 0.444, \text{ and}$$

$$score_{match} = \frac{0.9 + 0.444}{2} = 0.672.$$

In some embodiments, for a triple t=(a, r, v), the weight of the triple(weight(t)) can be determined as follows:

$$weight(t) = weight_{role}(a,r) + \delta weight_{value}(v),$$

where $weight_{role}(a,r)$ is the weight of the role, $weight_{value}(v)$ is the weight of the value, and δ is a hyper-parameter. The $weight_{role}(a,r)$ measures the degree of importance of role r for action a. For example, in the example described above, Goal_Status would have a higher weight for the action "save" than Context Product because Goal_Status carries more important information than Context_Product. The importance of the role generally depends on the type of action. To determine the weight(a,r), a query log is preprocessed with the semantic analyzer, and then a conditional probability of the role r for a given action a is determined based on two types of frequencies:

$$weight_{role}(a, r) = \frac{freq(a, r, *)}{freq(a, *, *)},$$

where freq(a,*,*) is the probability that action a appears in a triple of the semantic representations, and freq(a,r,*) is the probability that both action a and role r appear in a same triple. Thus, $weight_{role}(a,r)$ is a conditional probability measuring how often r appears when a appears. If the role r appears frequently in the query log when a appears, r is likely to be an important role for a. The $weight_{value}(v)$ measures how important it is to match the value v. In the above example of query ("how to save in gif format in photoshop"), words such as "save" and "gif" would be more important to be matched while "photoshop" may be less important. In some embodiments, to model the importance of each individual word, the TF-IDF score can be derived from the query result repository based on the frequency the word appears in the query result repository and the inverse function of the number of in which the word appears:

$$weight_{value}(v)=TF/IDF(v).$$

In many cases, queries with a same meaning can be expressed in different ways. For example, the questions "how can I add watermark," "how can I embed watermark," and "how can I watermark an image" have a similar meaning. Due to the variability of the language expression for the same meaning, one of the challenges in QA is vocabulary gap between a query and a correct query result. For example, a query and a correct query result may use different vocabularies and thus the correct query result may never be considered. To address the vocabulary gap, paraphrases may be used because some paraphrases of a query may better match with a correct query result.

One method for mining the paraphrases (e.g., synonyms and related words) is to use a machine translation model. For example, two phrases that have the same meaning and are written in a same language may first be prepared, and a machine translation technique is then applied to determine the probability of translating one word to the other. This method is often referred to as the monolingual machine translation, where the probability represents the likelihood that two words are related (e.g., synonyms, morphological variations, etc.).

Another method (referred to as bilingual pivoting) also uses a machine translation technique, but is in a bilingual manner rather than in a monolingual manner. This method is based on the hypothesis that if two phrases are a proper translation of a phrase written in a different language, the two phrases are likely to be paraphrases.

A third method for modelling paraphrases in QA is to use an end-to-end neural network model. This method does not explicitly model the paraphrases. Rather, the neural network implicitly captures the paraphrasing phenomena such that the embedded vectors for the related queries/query results are closely located. This method typically uses a large amount of training data for the end-to-end neural network training.

In yet another method, user interaction data (e.g., user click data) is used to mine paraphrases based on a hypothesis that the queries associated with similar click behavior are likely to be paraphrases. However, this method merely identifies similar queries, rather than determining paraphrasing rules each associated with two semantic structures and a similarity score between the two semantic structures.

According to certain techniques disclosed herein, paraphrasing rules associated with semantic structures are determined from user click data, rather than merely identifying similar queries. As described above, in some embodiments, each paraphrasing rule includes a pair a semantic structures (e.g., triples) and a similarity score indicating the similarity of the pair of semantic structures. The paraphrasing rules can then be used by the QA system to select a query result that best matches (e.g., has a same meaning as) the query but uses different words.

FIG. 6 illustrates an example of user interaction data 600 (e.g., a web search query log) used for paraphrase mining according to certain embodiments. User interaction data 600 includes user click data during web searches. In the example shown in FIG. 6, user interaction data 600 is collected from web search query logs of the Adobe user help website. User interaction data 600 includes a set of triples. Each triple is in the form of (query, URL, frequency), where the query is the user query, the URL refers to the URL of a webpage that the user clicks after a web search using the query, and the frequency refers to the frequency that users click the webpage associated with the URL after web searches using the query. For example, one triple in user interaction data 600 include a query "how do I enable adobe flash player" and a URL that users clicked 409 times after the query.

Based on the user interaction data, such as user interaction data 600, similarity scores between pairs of queries can be determined. First, a matrix is constructed where each row corresponds to a query, each column corresponds to a URL, and the value of each cell represents the frequency that users click the corresponding URL after entering the corresponding query.

FIG. 7 illustrates an example of a frequency matrix 700 generated from user interaction data (e.g., user interaction data 600) according to certain embodiments. Each row in frequency matrix 700 corresponds to a user query, and is referred to as a row vector or query vector. Each column in frequency matrix 700 corresponds to a URL, and is referred to as a column vector. The value of each cell in frequency matrix 700 represents the frequency that users click the corresponding URL after entering the corresponding query. For example, the number 409 in frequency matrix 700 indicates that the corresponding URL of the column where the cell is located has been clicked 409 times after the users enter query "how do I enable adobe flash player?"

In some embodiments, each cell may be assigned a weight using, for example, TF-IDF or pointwise mutual information (PMI) weighting technique. In some embodiments, dimension-reduction techniques (e.g., principal component analysis) are used to reduce the size of the matrix. The query vectors are then normalized, and, for each pair of normalized query vectors, a cosine similarity score is calculated. In this way, query-to-query similarity scores, including a set of triples in the form of (query1, query2, score) are generated using user interaction data (such as user interaction data 600 shown in FIG. 6).

FIG. 8 illustrates examples of query-to-query similarity scores according to certain embodiments. As shown in FIG. 8, the query-to-query similarity scores include a set of triples, where each triple includes two phrases and a similarity score. For example, a triple shown in FIG. 8 includes a phrase "create a flyer in photoshop," a phrase "creating a flyer," and a similarity score 1.0 between the two phrases. In some embodiments, the similarity score is between [−1, 1].

The semantic analysis described above is performed on the query-to-query similarity scores described above with respect to FIG. 8 to convert the two phrases in a natural language in each triple into their semantic representations. Candidate paraphrasing rules can then be extracted from the query-to-query similarity scores based on the semantic representations of the phrases in the query-to-query similarity scores and certain rules. For example, two triples (a1, r1, v1) and (a2, r2, v2) can be used to construct a candidate paraphrasing rule based on the following rules:

Rule 1: if a1 is same as or a synonym of a2 and r1 is same as r2, the two triples can form a candidate paraphrasing rule.

Rule 2: if a1 is same as or a synonym of a2 and v1 is related to v2 (e.g., v1 is same as v2, v1 is a synonym of v2, or v1 is morphologically related to v2), the two triples can form a candidate paraphrasing rule.

One difference between Rule 1 and Rule 2 described above is that Rule 1 is used to extract candidate paraphrasing rules by considering the action and the role, while Rule 2 is used to extract candidate paraphrasing rules by considering the action and the value.

Figure 9:
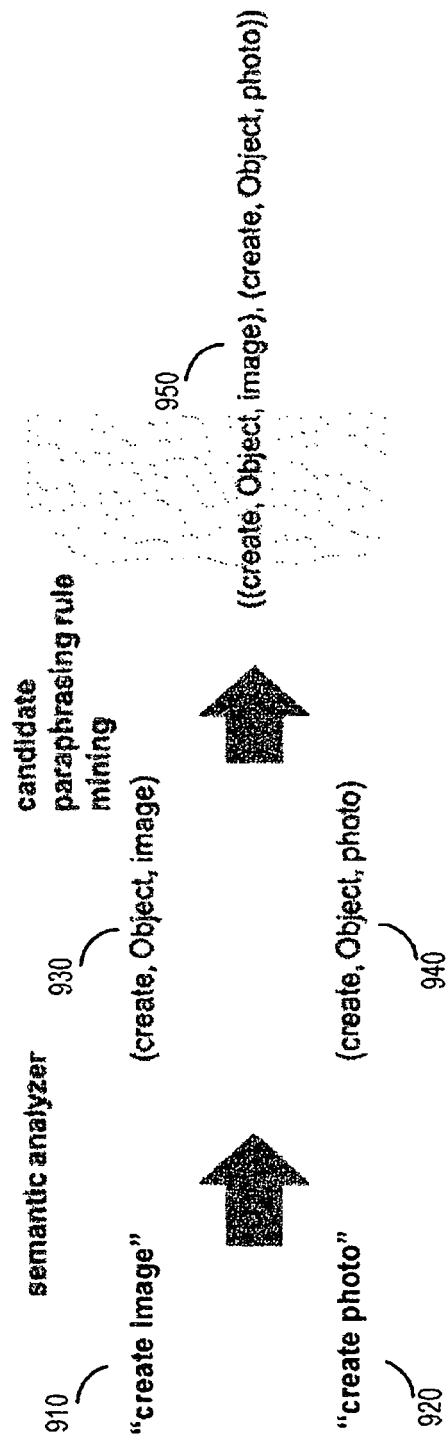
FIG. 9 illustrates an example of paraphrasing rule extraction according to certain embodiments.

FIG. 9 illustrates an example of paraphrasing rule extraction according to certain embodiments. As shown in the example, for a pair of phrases 910 ("create image") and 920 ("create photo"), the semantic representations of the pair of phrases include a triple 930 ("create," Object, "image") and a triple 940 ("create," Object, "photo"), respectively. Triple 930 ("create," Object, "image") and triple 940 ("create," Object, "photo") can form a candidate paraphrasing rule 950 according to Rule 1 because their actions ("create") and roles ("Object") are the same.

As another example, a triple ("create," Object, "transparency") representing phrase "create transparency" and a triple ("make," Goal_Status, "transparent") representing phrase "make the background transparent" can form a candidate paraphrasing rule according to Rule 2 because terms "transparency" and "transparent" are morphologically related.

After extracting candidate paraphrasing rules, each candidate paraphrasing rule is scored based on the query-to-query similarity scores as described above with respect to FIG. 8. For example, for each candidate paraphrasing rule including a first triple and a second triple, each query the sematic representation of which includes the first triple or the second triple is identified. Similarity scores between queries associated with the first triple and queries associated with the second triple are extracted from the query-to-query similarity scores as shown in FIG. 8. The top-K similarity scores are then averaged to generate a final similarity score for the candidate paraphrasing rule.

Figure 10:
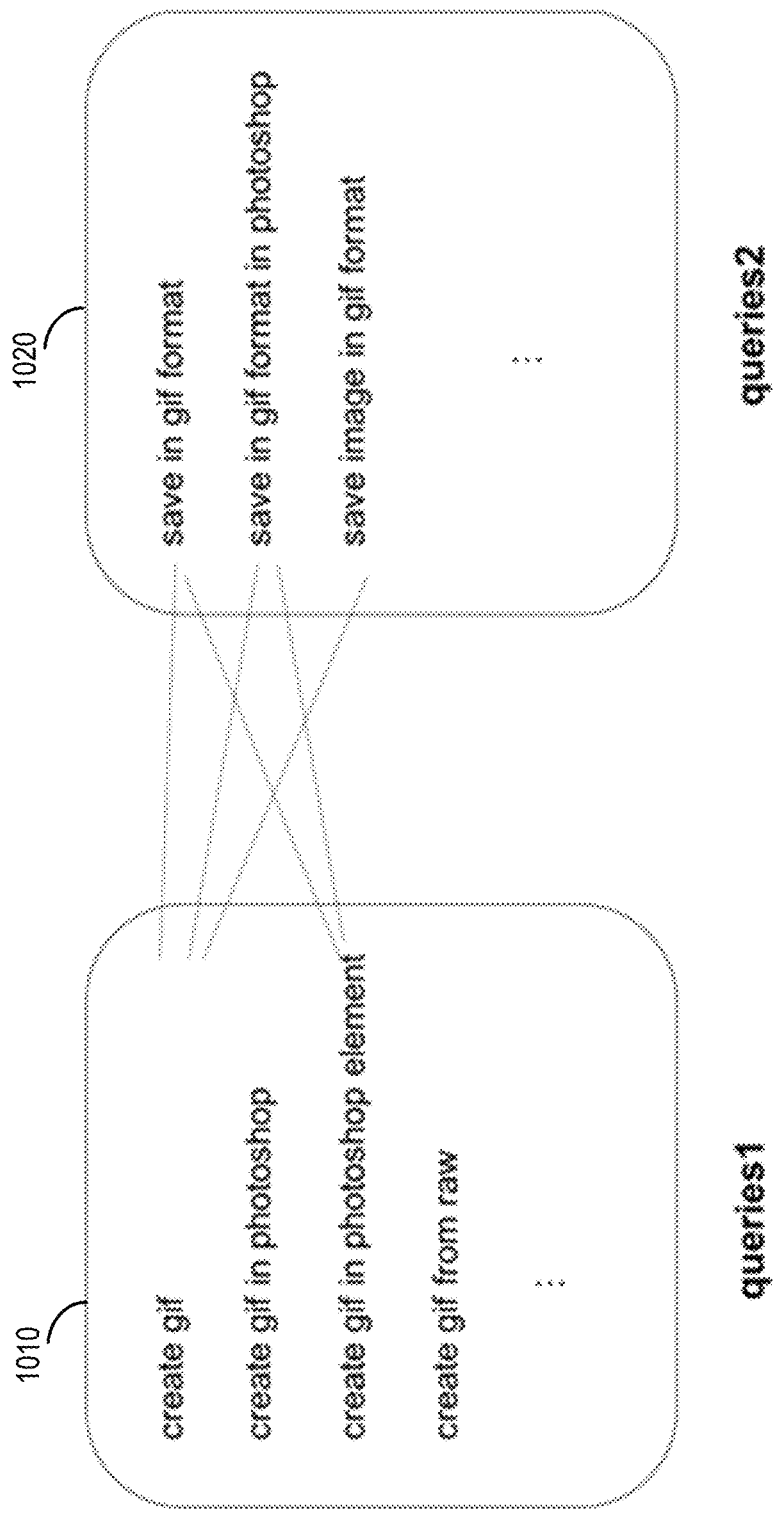
FIG. 10 illustrates an example of computing a similarity score for a paraphrasing rule according to certain embodiments.

FIG. 10 illustrates an example of computing a similarity score for a paraphrasing rule according to certain embodiments. In the example shown in FIG. 10, the candidate paraphrasing rule includes a first triple ("create," Object, "gif") and a second triple ("save," Goal_Status, "gif format"). A first set of queries 1010 each has the triple ("create," Object, "gif") in its semantic representation. A second set of queries 1020 each has the triple ("save," Goal_Status, "gif format") in its semantic representation. Each query in the first set of queries 1010 and each query in the second set of queries 1020 may correspond to the two queries of a triple in the query-to-query similarity scores as shown in FIG. 8, which also includes a similarity score between the two queries. Among triples in the query-to-query similarity scores that include a query from the first set of queries 1010 and a query from the second set of queries 1020, the top-K (e.g., 3) similarity scores are averaged and the average similarity score is used as the similarity score between the two triples in a paraphrasing rule.

Figure 11:
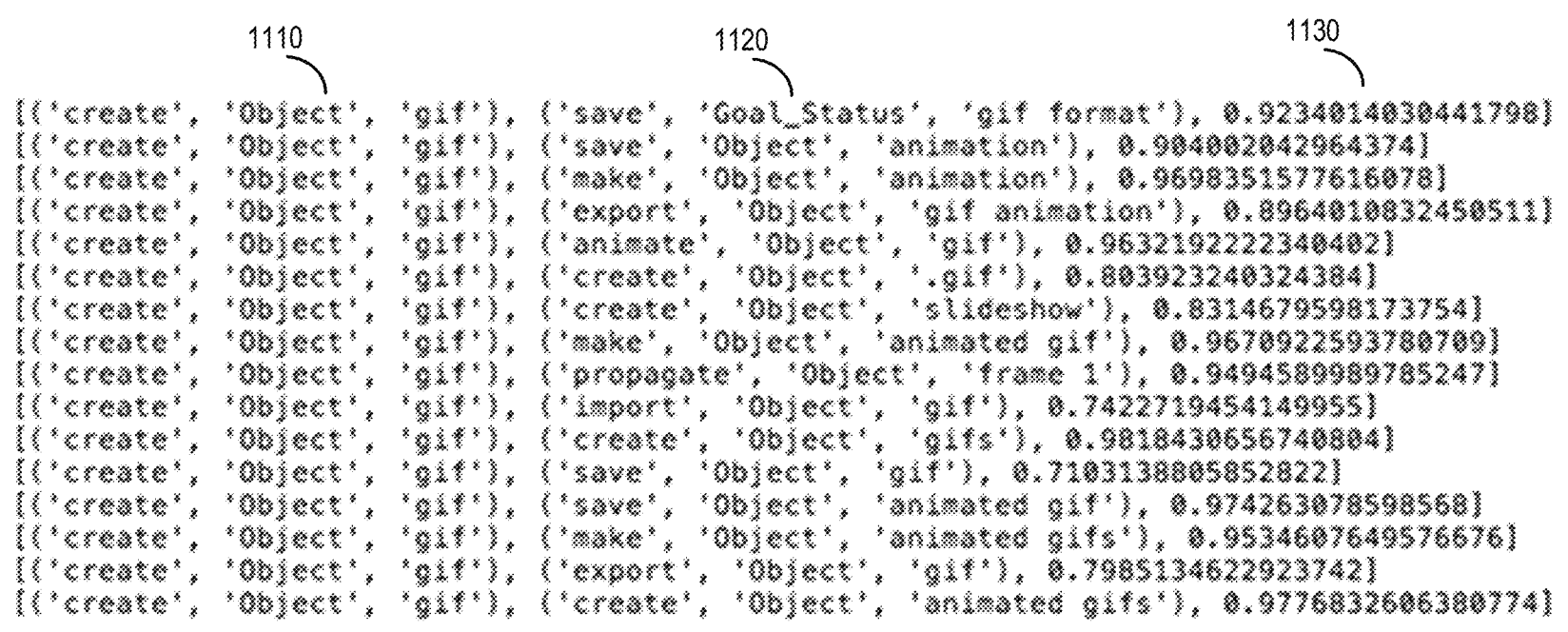

FIG. 11 illustrates examples of paraphrasing rules extracted from user interaction data according to certain embodiments. Each paraphrasing rule includes a triple 1110, a triple 1120, and a similarity score 1130. Triples 1110 and 1120 are semantic representations of two paraphrases. As described above, the paraphrasing rules can be used to determine the match score between the semantic representations of the query and the candidate query result.

The above-described techniques can significantly improve the accuracy of procedural question answering over other techniques. In one example of a procedural QA system according to certain techniques disclosed herein, a query result repository is built by extracting procedural answers from an official help website for Photoshop. The query result repository may include hundreds, thousands, or more of candidate query results. For example, in one implementation, the query result repository includes 1,665 candidate answer cards. An example of the extracted candidate query results is shown in FIG. 1 described above.

In the example, a subset of the Adobe's search query log is used as a test dataset. The subset only includes "how" queries that each include an action. Two different evaluation datasets are constructed using two different sampling methods. The first dataset is referred to as a Head dataset and is sampled based on the frequency of the queries to simulate the real deployment scenario. The second dataset is referred to a Tail dataset and is sampled assuming that the queries have an equal frequency. Unlike the Head dataset, the Tail dataset can include rare queries in order to evaluate the performance of the disclosed techniques for more diverse forms of language expressions in queries. The hyper-parameters used in the example are tuned using a separate dataset including 50 queries, which do not appear in the Head dataset or the Tail dataset. The performance of procedural QA system is compared with those of several other techniques, such as BM25 or machine translation (MT) technique.

BM25 is an information retrieval technique that has been used in many industry applications. See, e.g., Jones, K., et al., "A probabilistic model of information retrieval: Development and comparative experiments," Information Processing & Management, v. 36, n. 6, 779-808 (2000). BM25 technique independently scores each query term without considering the context of the query, and thus does not model the dependency structure of the query. Some techniques attempt to address the shortcoming of the BM25 technique (e.g., the assumption of independency between terms) by considering two or more query terms together (hereinafter referred to as the BM25+dep technique). See, e.g., Svore, K. M., et al., "How good is a span of terms? Exploiting proximity to improve web retrieval," Proceedings of the 33rd international ACM SIGIR conference on Research and development in information retrieval, 154-161 (July 2010). In BM25+dep technique, if two query terms appear proximately in the documents, the scores for the query terms are higher. One issue of the BM25+dep technique is that it ignores the grammatical dependency structures of the queries and considers all possible pairs of the terms (which may not be related at all), rather than identifying the actions and their semantic roles to consider only important dependency between terms. In addition, the lexical mismatch between the queries and the query results has been a challenging problem. Thus, some information retrieval techniques, such as BM25, may not be able to retrieve the relevant query results. One technique to handle the lexical mismatch issue is to use machine translation (MT) to discover related terms (such as synonyms, morphological derivation, etc.) (hereinafter referred to as the MT technique). See, e.g., Zhou, Guangyou, et al., "Phrase-based translation model for question retrieval in community question answer archives," Proceedings of the 49th Annual Meeting of the Association for Computational Linguistics, 653-662 (June 2011). However, the machine translation technique also generally ignores the grammatical dependency structure of the queries.

For the Head dataset and Tail dataset, several metrics are measured to determine the performance of the disclosed techniques. These metrics include, for example, normalized discount cumulative gain (NDCG), accuracy, precision, and recall. For NDCG, the top K (e.g., 3) candidate query results returned by the procedural QA system are considered in the example. The accuracy is defined as $$\frac{\sum_{q \in Q} score_k(q)}{|Q|},$$

where Q is a set of queries including all queries. The precision is defined as $$\frac{\sum_{q \in Q} score_k(q)}{|Q|},$$

where Q includes a set of queries the answers to which are returned by the QA system. The recall is defined as $$\frac{\sum_{q \in Q} score_k(q)}{|Q|},$$

where Q includes a set of queries with ground truth query results. $score_k(q)$ is 1 if the QA system returns a correct query result in the top-K query results for a query q within the set of queries Q. Otherwise, $score_k(q)$ is 0. K can be a number equal to or greater than 1, such as 1 or 3.

Table 3 shows the experimental results for the Head dataset and the Tail dataset using different QA techniques, where "SA" corresponds to the semantic analysis-based QA technique disclosed herein. In Table 3, the value outside of the parenthesis in each cell indicates the performance of a QA technique when the QA system only returns the best query result, while the value in the parenthesis in each cell indicates the performance of a QA technique when the QA system returns the top three query results. For both datasets, the techniques disclosed herein significantly outperform other techniques (e.g., improving all metrics by about 30-60%) due to, for example, modeling the semantic dependency of words in the queries and using paraphrasing rules mined from user interaction data. The results can be further improved by tuning the systems.

The performance of the QA systems in a real deployment is also evaluated. In the real deployment, the precision should be almost perfect (e.g., close to 100%). Otherwise, the user experience would be severely affected when an incorrect query result is returned. In order to ensure a perfect precision, the information fed to the QA systems (e.g., the paraphrasing rules) should be clean. In other words, only correct information should be given to the systems. In some embodiments, the paraphrasing rules can be manually cleaned. The semantic representations (e.g., triples) of the query and the semantic representations of the title of the candidate query result should be completely aligned. In other words, there should be no unaligned triple in semantic representations of the query or the semantic representations of the title of the candidate query result. In some embodiments, the threshold of the match score between the query and a candidate query result for the QA system to return the candidate query result as the answer to the user's query is adjusted (e.g., increased) to ensure a precision of 1 for the returned query results. The QA system returns "No answer found" if the match score of each candidate query result is lower than the threshold.

Table 4 shows the recall results of the QA systems. For a BM25-based QA system, to achieve a precision of 1, the threshold of the match score needs to be set to a very high value. As such, out of the 331 queries with known ground-truth query results in the query result repository, the BM25-based QA system only returns 3 correct query results (a recall value of about 0.01) and returns 328 results with "No answer found." In contrast, the semantic analysis-based QA system disclosed herein returns 169 corrected query results (a recall value of 0.51).

TABLE 4

Recall when the QA systems are tuned to have a perfect precision

|  | Semantic analysis-based | BM25 |
| --- | --- | --- |
| Recall (k = 1) | .51 (169/331) | .009 (3/331) |

Any suitable computing system or group of computing systems can be used for performing the operations described herein. For example, FIG. 12 depicts an example of the computing system 1200. The implementation of computing system 1200 could be used for one or more of QA system 200 and query result scoring subsystem 310.

The depicted example of a computing system 1200 includes a processor 1202 communicatively coupled to one or more memory devices 1204. The processor 1202 executes computer-executable program code stored in a memory device 1204, accesses information stored in the memory device 1204, or both. Examples of the processor 1202 include a microprocessor, an application-specific integrated circuit ("ASIC"), a field-programmable gate array ("FPGA"), or any other suitable processing device. The processor 1202 can include any number of processing devices, including a single processing device.

A memory device 1204 includes any suitable non-transitory computer-readable medium for storing program code 1215, program data 1216, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

TABLE 3

Evaluation results for the Head dataset and the Tail dataset

| | Head dataset | | | | Tail dataset | | | |
| --- | --- | --- | --- | --- | --- | --- | --- | --- |
| | SA | BM25 | BM25+dep | MT | SA | BM25 | BM25+dep | MT |
| NDCG | .47 | .31 | .36 | .28 | .38 | .28 | .25 | .18 |
| Acc. | .63 (.73) | .36 (.45) | .34 (.51) | .31 (.41) | .57 (.63) | .31 (.42) | .23 (.41) | .17 (.32) |
| Prec. | .70 (.82) | .36 (.46) | .34 (.51) | .31 (.41) | .65 (.72) | .32 (.43) | .23 (.42) | .17 (.32) |
| Rec. | .63 (.74) | .38 (.48) | .36 (.54) | .32 (.43) | .56 (.62) | .34 (.45) | .25 (.45) | .18 (.35) |

The computing system 1200 may also include a number of external or internal devices, an input device, a presentation device, or other input or output devices. For example, computing system 1200 is shown with one or more input/output ("I/O") interfaces 1208. An I/O interface 1208 can receive input from input devices or provide output to output devices. One or more buses 1206 are also included in the computing system 1200. The bus 1206 communicatively couples one or more components of a respective one of the computing system 1200.

The computing system 1200 executes program code that configures the processor 1202 to perform one or more of the operations described herein. Examples of the program code include suitable applications that perform one or more operations described herein. The program code may be resident in the memory device 1204 or any suitable computer-readable medium and may be executed by the processor 1202 or any other suitable processor.

In some embodiments, one or more memory devices 1204 store program data that includes one or more datasets and models described herein. Examples of these datasets include interaction data, experience metrics, training interaction data or historical interaction data, transition importance data, etc. In some embodiments, one or more of data sets, models, and functions are stored in the same memory device (e.g., one of the memory devices 1204). In additional or alternative embodiments, one or more of the programs, data sets, models, and functions described herein are stored in different memory devices 1204 accessible via a data network.

In some embodiments, the computing system 1200 also includes a network interface device 1210. The network interface device 1210 includes any device or group of devices suitable for establishing a wired or wireless data connection to one or more data networks. Non-limiting examples of the network interface device 1210 include an Ethernet network adapter, a modem, and/or the like. The computing system 1200 is able to communicate with one or more other computing devices via a data network using the network interface device 1210.

In some embodiments, the computing system 1200 also includes the input device and the presentation device. FIG. 12. An input device can include any device or group of devices suitable for receiving visual, auditory, or other suitable input that controls or affects the operations of the processor 1202. Non-limiting examples of the input device include a touchscreen, a mouse, a keyboard, a microphone, a separate mobile computing device, etc. A presentation device can include any device or group of devices suitable for providing visual, auditory, or other suitable sensory output. Non-limiting examples of the presentation device include a touchscreen, a monitor, a speaker, a separate mobile computing device, etc.

Although FIG. 12 depicts the input device and the presentation device are described as being local to the described computing device, other implementations are possible. For instance, in some embodiments, one or more of the input device and the presentation device can include a remote client-computing device that communicates with the computing system 1200 via the network interface device 1210 using one or more data networks described herein.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an openended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A computer-implemented method for retrieving, by one or more processing devices, a query result for a natural language query, the method comprising:
   generating a query semantic representation for the natural language query received from a user device, the query semantic representation indicating a relationship between terms in the natural language query, wherein the query semantic representation comprises a plurality of query triples;
   retrieving, from a query result repository, a set of candidate query results for the natural language query;
   upon retrieving the set of candidate query results for the natural language query, generating a result semantic representation for a candidate query result from the set of candidate query results, the result semantic representation indicating a relationship between terms in the candidate query result, wherein the result semantic representation comprises a plurality of result triples;
   determining a match score between the natural language query and the candidate query result based on a weighted average of alignment scores for the plurality of query triples and a weighted average of alignment scores for the plurality of result triples;
   selecting, as the query result, the candidate query result based on the match score being higher than other match scores computed for other candidate query results from the set of candidate query results; and
   sending the query result to the user device.

2. The computer-implemented method of claim 1, wherein:
   each triple of the plurality of query triples and each triple of the plurality of result triples includes a form of (action, role, value), the action in each triple including an action term in the natural language query or the candidate query result, the value in each triple including a term in the natural language query or the candidate query result, and the role in each triple indicating a role of the value with respect to the action.

3. The computer-implemented method of claim 2, further comprising, for each triple in the result semantic representation:
   determining, based on a set of rules, an alignment score between a result triple of the plurality of result triples and a query triple of the plurality of query triples.

4. The computer-implemented method of claim 3, wherein determining the match score between the natural language query and the candidate query result comprises:
   determining a first weighted average of alignment scores for the plurality of query triples in the query semantic representation;
   determining a second weighted average of alignment scores for the plurality of result triples in the result semantic representation; and
   determining an average of the first weighted average and the second weighted average, wherein the average corresponds to the match score between the natural language query and the candidate query result.

5. The computer-implemented method of claim 4, wherein determining the match score between the natural language query and the candidate query result further comprises:
   adjusting the match score using a scaling factor and a match score between the natural language query and the candidate query result determined based on the terms in the natural language query and the candidate query result but not based on a relationship between the terms in the natural language query or a relationship between the terms in the candidate query result.

6. The computer-implemented method of claim 4, wherein:
   a weight associated with a query triple of the plurality of query triples or a result triple of the plurality of result triples is determined based on a weight of the value of the query triple or the result triple and a weight of the role of the query triple or the result triple with respect to the action of the triple;
   the weight of the role is determined based on a probability that the role appears in the query triple or the result triple when the action appears in the query triple or the result triple; and
   the weight of the value is determined based on a term frequency-inverse document frequency (TF-IDF) score.

7. The computer-implemented method of claim 3, wherein the method further comprises:
   obtaining a set of paraphrasing rules indicating similarity scores between semantic representations of paraphrases, each paraphrasing rule including two triples representing a pair of paraphrases and a similarity score between the two triples,
   wherein the set of rules includes the set of paraphrasing rules.

8. The computer-implemented method of claim 7, wherein the method further comprises extracting the set of paraphrasing rules from user interaction data associated with a website, the user interaction data including, for each query in the user interaction data, a frequency that a website is visited by users after the query.

9. The computer-implemented method of claim 8, wherein extracting the set of paraphrasing rules comprises:
   computing a query-to-query similarity score between each pair of queries in the user interaction data;
   performing semantic analysis on queries in the user interaction data to generate semantic representations for the queries;
   extracting candidate paraphrases from the queries based on the semantic representations for the queries; and
   generating the set of paraphrasing rules based on the semantic representations for the candidate paraphrases and corresponding query-to-query similarity scores.

10. The computer-implemented method of claim 9, wherein extracting the candidate paraphrases from the queries based on the semantic representations for the queries comprises, for a first query represented by a first triple (a1, r1, v1) and a second query represented by a second triple (a2, r2, v2):
    if a1 is same as or a synonym of a2 and r1 is same as r2, the first query and the second query include paraphrases; or
    if a1 is same as or a synonym of a2 and v1 is related to v2, the first query and the second query include paraphrases.

11. The computer-implemented method of claim 9, wherein computing the query-to-query similarity score between each pair of queries comprises:
    generating a frequency matrix based on the user interaction data, wherein each row of the frequency matrix corresponds to a query in the user interaction data and forms a query vector, each column of the frequency matrix corresponds to a webpage, and a value in each cell of the frequency matrix indicates a number of times users visit a corresponding webpage after submitting a corresponding query; and
    determining a cosine similarity value between two query vectors corresponding to the pair of queries, wherein the cosine similarity value corresponds to the query-to-query similarity score between the pair of queries.

12. The computer-implemented method of claim 3, wherein determining the alignment score comprises, for a first triple (a1, r1, v1) and a second triple (a2, r2, v2):
    if a1 is same as or a synonym of a2, r1 is same as r2, and v1 is same as or a synonym of v2, the first triple and the second triple are aligned with an alignment score 1; or
    if the first triple and the second triple correspond to a pair of paraphrases, the first triple and the second triple are aligned and the alignment score is a similarity score indicated by a paraphrasing rule.

13. The computer-implemented method of claim 1, wherein:
    each candidate query result is in a form of an answer card and includes a title; and
    generating the result semantic representation comprises generating a semantic representation for the title of the candidate query result.

14. A system comprising:
    a processing device; and
    a non-transitory computer-readable medium communicatively coupled to the processing device, wherein the processing device is configured to execute program code stored in the non-transitory computer-readable medium and thereby perform operations comprising:
      generating a query semantic representation for a natural language query received from a user device, the query semantic representation indicating a relationship between terms in the natural language query, wherein the query semantic representation comprises a plurality of query triples;
      retrieving, from a query result repository, a set of candidate query results for the natural language query;
      upon retrieving the set of candidate query results for the natural language query, generating a result semantic representation for a candidate query result from the set of candidate query results, the result semantic representation indicating a relationship between terms in the candidate query result, wherein the result semantic representation comprises a plurality of result triples;
      determining a match score between the natural language query and the candidate query result based on a weighted average of alignment scores for the plurality of query triples and a weighted average of alignment scores for the plurality of result triples;
      selecting, as a query result, the candidate query result based on the match score being higher than other match scores computed for other candidate query results from the set of candidate query results; and
      sending the query result to the user device.

15. The system of claim 14, wherein:
    each triple of the plurality of query triples and each triple of the plurality of result triples includes a form of (action, role, value), the action in each triple including an action term in the natural language query or the candidate query result, the value in each triple including a term in the natural language query or the candidate query result, and the role in each triple indicating a role of the value with respect to the action.

16. The system of claim 15, wherein:
    the operations further comprise, for each triple in the result semantic representation, determining, based on a set of rules, an alignment score between a result triple of the plurality of result triples and a query triple of the plurality of query triples; and
    determining the match score between the natural language query and the candidate query result comprises:
      determining a first weighted average of alignment scores for plurality of query triples in the query semantic representation;
      determining a second weighted average of alignment scores for the plurality of result triples in the result semantic representation; and
      determining an average of the first weighted average and the second weighted average, wherein the average corresponds to the match score between the natural language query and the candidate query result.

17. The system of claim 16, wherein:
    the operations further comprise extracting a set of paraphrasing rules from user interaction data associated with a website, the user interaction data including, for each query in the user interaction data, a frequency that a website is visited by users after the query;
    each paraphrasing rule includes two triples representing a pair of paraphrases and a similarity score between the two triples; and
    the set of rules includes the set of paraphrasing rules.

18. A question answering system comprising:
means for generating a query semantic representation for a natural language query received from a user device, the query semantic representation indicating a relationship between terms in the natural language query, wherein the query semantic representation comprises a plurality of query triples;
means for retrieving, from a query result repository, a set of candidate query results for the natural language query;
means for generating a result semantic representation for a candidate query result from the set of candidate query results upon retrieving the set of candidate query results for the natural language query, the result semantic representation indicating a relationship between terms in the candidate query result, wherein the result semantic representation comprises a plurality of result triples;
means for determining a match score between the natural language query and the candidate query result based on a weighted average of alignment scores for the plurality of query triples and a weighted average of alignment scores for the plurality of result triples;
means for selecting, as a query result, the candidate query result based on the match score being higher than other match scores computed for other candidate query results from the set of candidate query results; and
means for sending the query result to the user device.

19. The question answering system of claim 18, wherein:
each triple of the plurality of query triples and each triple of the plurality of result triples includes a form of (action, role, value), the action in each triple including an action term in the natural language query or the candidate query result, the value in each triple including a term in the natural language query or the candidate query result, and the role in each triple indicating a role of the value with respect to the action.

20. The question answering system of claim 19, further comprising:
means for determining, for each result triple of the plurality of result triples in the result semantic representation, based on a set of rules, an alignment score between the result triple in the result semantic representation and a query triple of the plurality of query triples in the query semantic representation,
wherein the means for determining the match score between the natural language query and the candidate query result comprises:
means for determining a first weighted average of alignment scores for the plurality of query triples in the query semantic representation;
means for determining a second weighted average of alignment scores for the plurality of result triples in the result semantic representation; and
means for determining an average of the first weighted average and the second weighted average, wherein the average corresponds to the match score between the natural language query and the candidate query result.

* * * * *